(12) United States Patent
Gao et al.

(10) Patent No.: US 10,601,622 B2
(45) Date of Patent: Mar. 24, 2020

(54) METHODS AND APPARATUSES FOR TRANSMITTING AND RECEIVING UPLINK INFORMATION

(71) Applicant: NEC CORPORATION, Tokyo (JP)

(72) Inventors: Yukai Gao, Beijing (CN); Chuangxin Jiang, Beijing (CN); Zhennian Sun, Beijing (CN); Gang Wang, Beijing (CN)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/234,027

(22) Filed: Dec. 27, 2018

(65) Prior Publication Data
US 2019/0132173 A1    May 2, 2019

Related U.S. Application Data

(63) Continuation of application No. 16/066,533, filed as application No. PCT/CN2015/100194 on Dec. 31, 2015.

(51) Int. Cl.
*H04L 27/26* (2006.01)
*H04L 5/00* (2006.01)
(Continued)

(52) U.S. Cl.
CPC ........ *H04L 27/2613* (2013.01); *H04L 1/1607* (2013.01); *H04L 1/1829* (2013.01);
(Continued)

(58) Field of Classification Search
CPC ..... H04L 27/2613; H04L 5/00; H04L 5/0051; H04L 5/0053; H04L 5/0055; H04W 28/06; H04W 72/0413
See application file for complete search history.

(56) References Cited

U.S. PATENT DOCUMENTS 9,178,560 B1 * 11/2015 Kerhuel ................. H04J 13/00
2010/0041350 A1    2/2010 Zhang et al.
(Continued)

FOREIGN PATENT DOCUMENTS

EP    2 357 735 A2    8/2011
EP    2 533 451 A2    12/2012
(Continued)

OTHER PUBLICATIONS

Extended European Search Report dated Jun. 28, 2019 issued by the European Patent Office in counterpart application No. 15911958.5.
(Continued)

*Primary Examiner* — Min Jung
(74) *Attorney, Agent, or Firm* — Sughrue Mion, PLLC

(57) ABSTRACT

Embodiments of the present disclosure relate to a method and apparatus of transmitting uplink (UL) information and a method and apparatus of receiving UL information. In one embodiment of the present disclosure, the method of transmitting UL information comprises transmitting a reference signal using a first sequence; and transmitting UL control information using a second sequence; wherein a reference signal and the UL control information are staggered-multiplexed in frequency domain. With embodiments of the present disclosure, the uplink information can be transmitted in reduced uplink symbols so as to adapt for a proposed subframe structure with reduced uplink symbols and thus, the transmission latency can be reduced greatly.

36 Claims, 19 Drawing Sheets

(51) Int. Cl.
*H04W 72/04* (2009.01)
*H04L 1/16* (2006.01)
*H04L 1/18* (2006.01)
*H04W 28/06* (2009.01)

(52) U.S. Cl.
CPC .............. *H04L 1/1893* (2013.01); *H04L 5/00* (2013.01); *H04L 5/0051* (2013.01); *H04L 5/0053* (2013.01); *H04L 5/0055* (2013.01); *H04W 28/06* (2013.01); *H04W 72/0413* (2013.01)

(56) References Cited

U.S. PATENT DOCUMENTS

| | | | |
|---|---|---|---|
| 2011/0002322 A1* | 1/2011 | Kim | H04J 11/0023 370/344 |
| 2011/0228877 A1 | 9/2011 | Han et al. | |
| 2012/0039276 A1* | 2/2012 | Li | H04L 1/0026 370/329 |
| 2014/0226591 A1* | 8/2014 | Han | H04L 1/0031 370/329 |
| 2015/0289275 A1 | 10/2015 | Nakamura et al. | |
| 2017/0171008 A1* | 6/2017 | Han | H04B 7/0671 |
| 2018/0103467 A1* | 4/2018 | Seo | H04L 1/0041 |
| 2018/0139014 A1* | 5/2018 | Xiong | H04L 1/18 |
| 2018/0316464 A1* | 11/2018 | Stern-Berkowitz | H04L 1/0034 |

FOREIGN PATENT DOCUMENTS

| | | |
|---|---|---|
| EP | 2 562 981 A2 | 2/2013 |
| JP | 2013-509830 A | 3/2013 |
| JP | 2013-540394 A | 10/2013 |
| RU | 2566557 C1 | 10/2015 |
| WO | 2010/018977 A2 | 2/2010 |
| WO | 2011/053836 A2 | 5/2011 |
| WO | 2014/038460 A1 | 3/2014 |
| WO | 2014/113546 A1 | 7/2014 |
| WO | 2014/179964 A1 | 11/2014 |
| WO | 2014/201614 A1 | 12/2014 |
| WO | 2015/042810 A1 | 4/2015 |
| WO | 2015/094816 A1 | 6/2015 |

OTHER PUBLICATIONS

Communication dated Jul. 23, 2019 issued by the Japanese Patent Office in counterpart application No. 2018-533071.
Communication dated Mar. 11, 2019, from the Canadian Intellectual Property Office in counterpart application No. 3,009,705.
Communication dated Mar. 15, 2019, from Russian Patent and Trademark Office in counterpart application No. 2018123310/08.
Written Opinion for PCT/CN2015/100194, dated Oct. 9, 2016.
International Search Report for PCT/CN2015/100194, dated Oct. 9, 2016.
Communication dated Dec. 10, 2019, from the Japanese Patent Office in counterpart application No. 2018-533071.
3GPP TS 36.211 V12.7.0, dated Sep. 12, 2015, pp. 38-41 (4 pages total).
Panasonic, "Discussion on PUCCH and UCI transmission for MTC UEs", 3GPP TSG RAN WG1 Meeting #81, R1-152914, Fukuoka, Japan, May 25-29, 2015, pp. 1-5 (5 pages total).
LG Electronics, "New PUCCH format design for Rel-13 Ca", 3GPP TSG RAN WG1 Meeting #82bis, R1- 155375, Agenda item 7.2.2.1.1, Malmö, Sweden, Oct. 5-9, 2015 (10 pages total).
NTT Docomo, Inc., "Wf on Pusch-like new Pucch format", 3GPP Tsg Ran WG1 #82bis, R1- 156124, Agenda item 7.2.2.1.1, Malmö, Sweden, Oct. 5-9, 2015 (5 pages total).
U.S. Appl. No. 62/265,435 filed on Dec. 10, 2015.
U.S. Appl. No. 62/272,835 filed on Dec. 30, 2015.

* cited by examiner

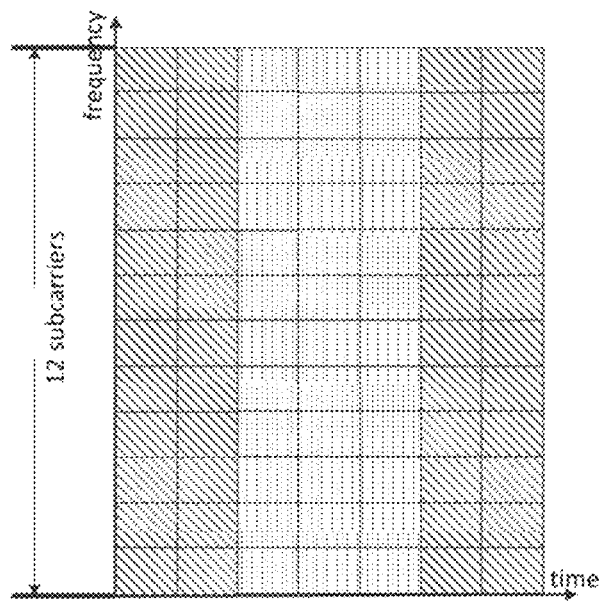
Fig. 1    (Related Art)
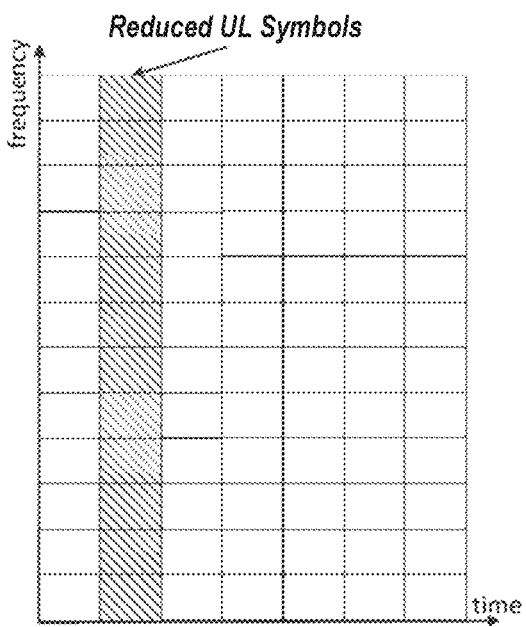
Fig. 2

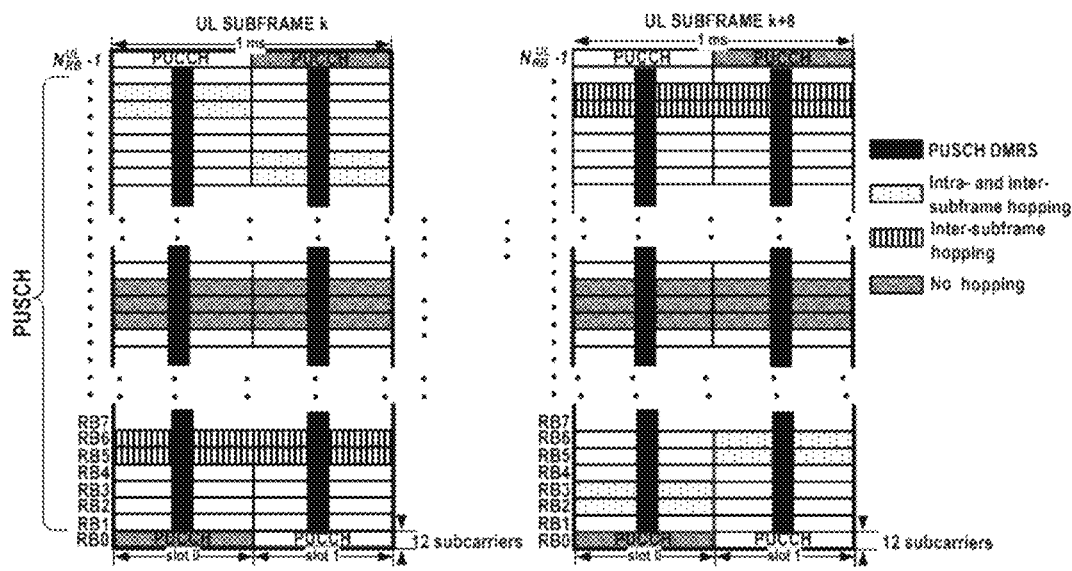
Fig. 3    (Related Art)
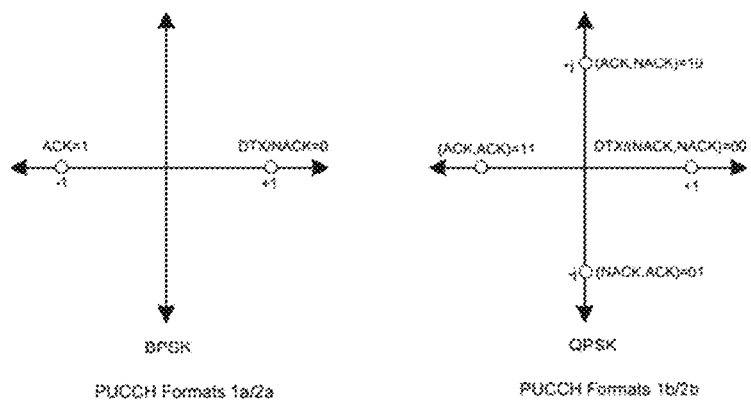
Fig. 4

| Base sequence | $R_n = e^{j\varphi(n)\pi/4}$, $0 \leq n \leq 11$ | | | | | | | | | | | |
|---|---|---|---|---|---|---|---|---|---|---|---|---|
| u | $\varphi(0),...,\varphi(11)$ | | | | | | | | | | | |
| 0 | -1 | 1 | 3 | -3 | 3 | 3 | 1 | 1 | 3 | 1 | -3 | 3 |

| Sequence index $n$ | Orthogonal sequence $[R_n(0)\ R_n(1)\ \cdots\ R_n(5)\ ]$ |
|---|---|
| 0 | $[1\ \ 1\ \ 1\ \ 1\ \ 1\ \ 1]$ |
| 1 | $[1\ \ e^{j2\pi/6}\ \ e^{j4\pi/6}\ \ e^{j6\pi/6}\ \ e^{j8\pi/6}\ \ e^{j10\pi/6}]$ |
| 2 | $[1\ \ e^{j4\pi/6}\ \ e^{j8\pi/6}\ \ 1\ \ e^{j4\pi/6}\ \ e^{j8\pi/6}]$ |
| 3 | $[1\ \ -1\ \ 1\ \ -1\ \ 1\ \ -1]$ |
| 4 | $[1\ \ e^{j8\pi/6}\ \ e^{j4\pi/6}\ \ 1\ \ e^{j8\pi/6}\ \ e^{j4\pi/6}]$ |
| 5 | $[1\ \ e^{j10\pi/6}\ \ e^{j8\pi/6}\ \ e^{j6\pi/6}\ \ e^{j4\pi/6}\ \ e^{j2\pi/6}]$ |

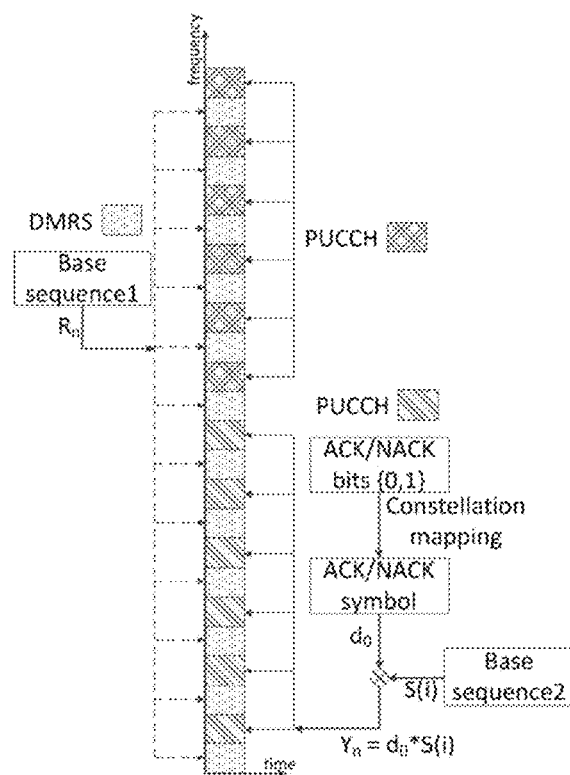
Fig. 13
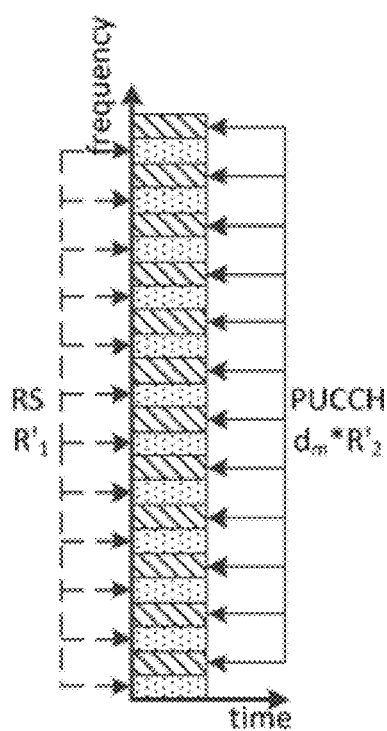 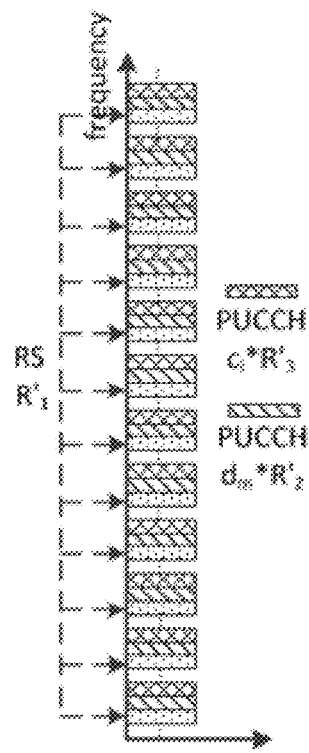 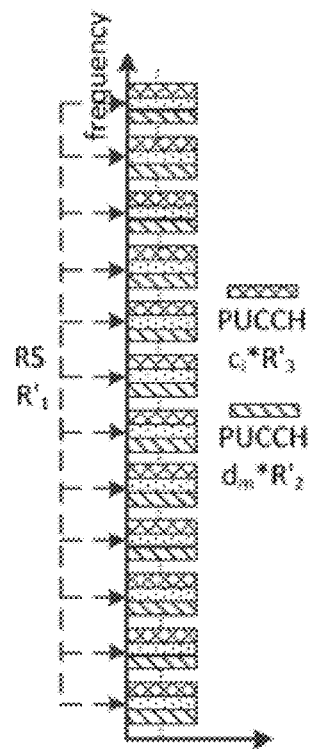
Fig. 14A    Fig. 14B    Fig. 14C

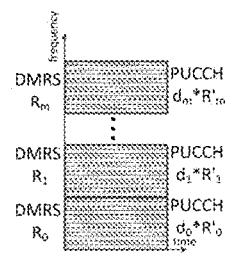
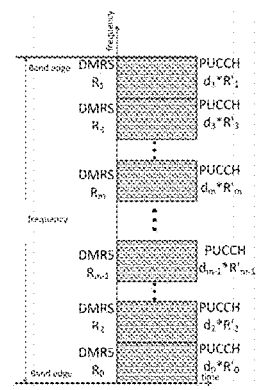
Fig. 15C
Fig. 15D
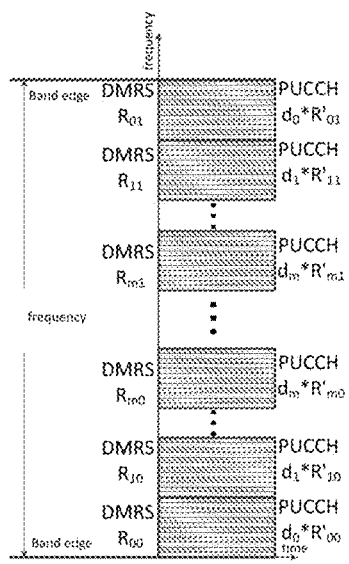
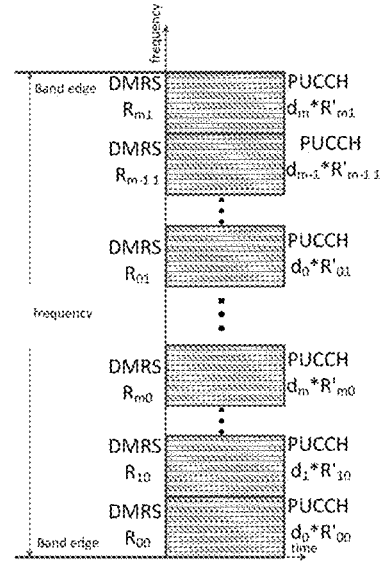
Fig. 15E
Fig. 15F

| Modulation symbol | $d_1$ | $d_2$ | ... | $d_i$ |
|---|---|---|---|---|
| Sequence group | $k_1$ | $k_2$ | ... | $k_i$ |

| cyclicShift | modulation | Or modulation |
|---|---|---|
| 0 | +1 | +1 |
| 1 | +1 | -1 |
| 2 | +1 | +j |
| 3 | -1 | -j |
| 4 | -1 | +1 |
| 5 | -1 | -1 |
| 6 | +j | +j |
| 7 | +j | -j |
| 8 | +j | +1 |
| 9 | -j | -1 |
| 10 | -j | +j |
| 11 | -j | -j |

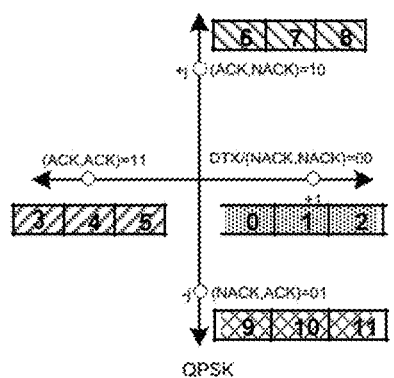
Fig. 24
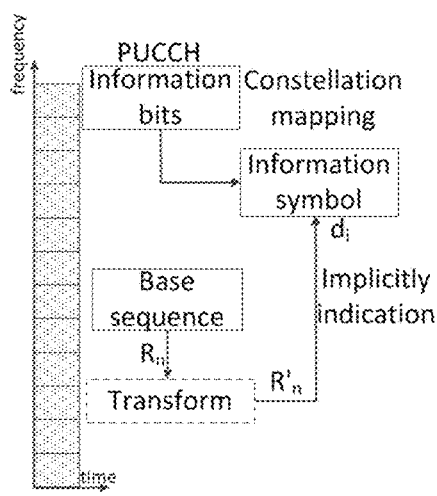
Fig. 25
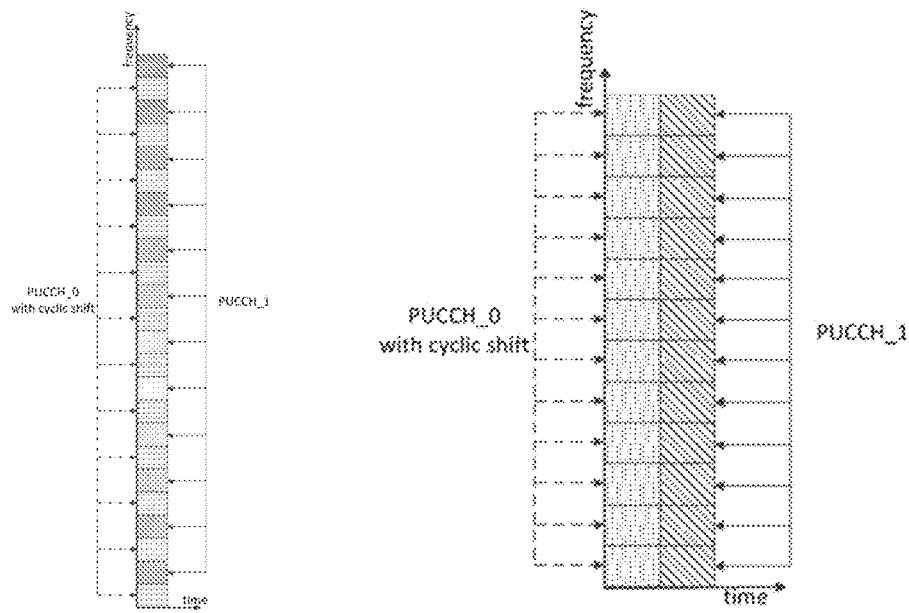
Fig. 26A     Fig. 26B

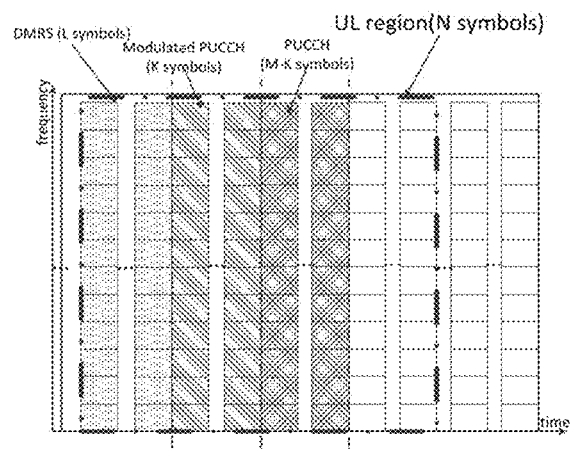 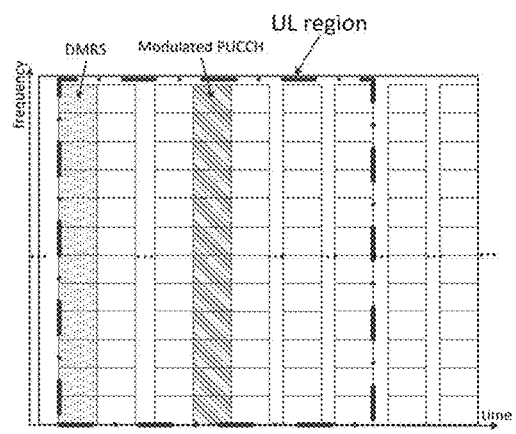
Fig. 27A          Fig. 27B
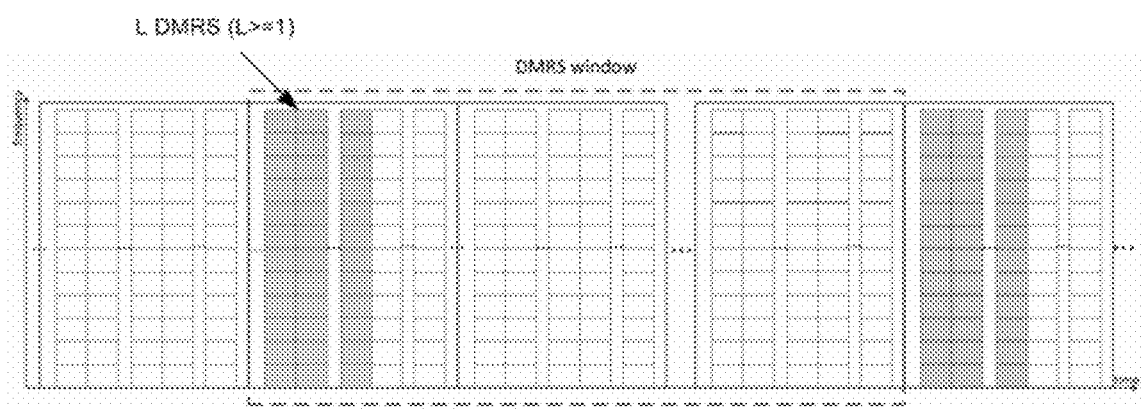
Fig. 28A
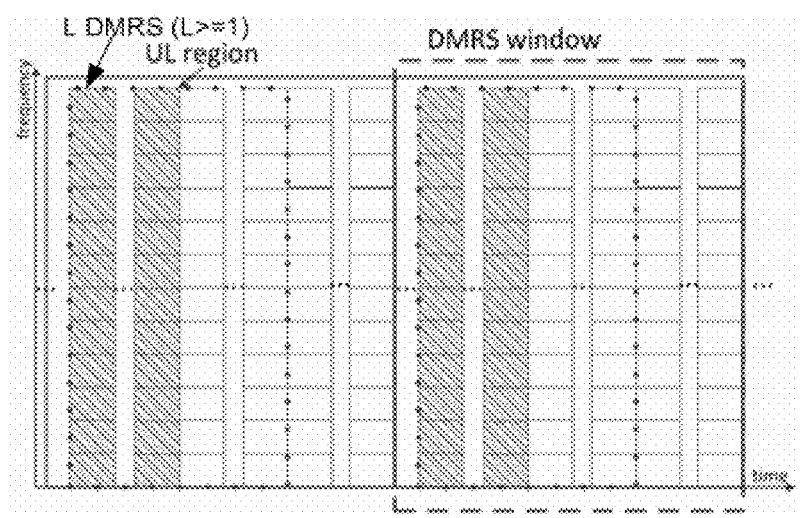
Fig. 28B

METHODS AND APPARATUSES FOR TRANSMITTING AND RECEIVING UPLINK INFORMATION

FIELD OF THE INVENTION

Embodiments of the present disclosure generally relate to wireless communication techniques and more particularly relate to a method and apparatus for transmitting uplink (UL) information and a method and apparatus for receiving UL information.

BACKGROUND OF THE INVENTION

In an existing wireless communication, a subframe comprises 2 slots each including seven symbols. As illustrated in FIG. 1, all seven symbols in a slot can be used as UL symbols for Physical Uplink Control Channel (PUCCH) transmission, Demodulation Reference Signal (DMRS) transmission, and etc. The PUCCH is UL channel which carries uplink control information, such as ACK/NACK, Channel Quality Indicator (CQI), Pre-coding Matrix Indicator (PMI), (Rank Indicator) RI, etc. As illustrated in FIG. 1, three middle symbols are used to transit DMRS and other symbols are used to transmit PUCCH symbols.

Usually, after a symbol is transmitted, the ACK/NACK will be received on the PUCCH before further four symbols are transmitted, which means a substantial latency. In order to reduce the latency, the number of UL symbols is proposed to be reduced. In future 5 Generation (5G) communication, a frame structure of only one or several symbols is even proposed for latency reduction, which means there is only one symbol or several symbols for UL transmission. For purpose of illustration, FIG. 2 illustrates one of possible new subframe structures, in which there is only one symbol for UL transmission. However, it shall be appreciated that in another possible new subframe structure, the symbol may also be located in another position and/or it comprises more than one UL symbol.

Therefore, a new PUCCH channel structure and new UL information transmission solution are required so as to adapt for the frame structure with reduced UL symbols.

SUMMARY OF THE INVENTION

In the present disclosure, there is provided a new solution for UL information transmission and receiving to mitigate or at least alleviate at least part of the issues in the prior art.

According to a first aspect of the present disclosure, there is provided a method of transmitting UL information. The method may comprise transmitting a reference signal using a first sequence; and transmitting UL control information using a second sequence; wherein the reference signal and the UL control information are staggered-multiplexed in frequency domain.

In a second aspect of the present disclosure, there is provided a method of receiving UL information. The method may comprise receiving reference signal transmitted using a first sequence; receiving control information transmitted using a second sequence; demodulating the control information using the reference signal; and wherein the reference signal and the UL control information are staggered-multiplexed in frequency domain.

In a third aspect of the present disclosure, there is also provided an apparatus for transmitting UL information. The apparatus may comprise a reference signal transmission unit, configured for transmitting reference signal using a first sequence; and a control information transmission unit, configured for transmitting UL control information using a second sequence; wherein the reference signal and the UL control information are staggered-multiplexed in frequency domain.

In a fourth aspect of the present disclosure, there is provided an apparatus of receiving UL information. The apparatus may comprise a reference signal receiving unit, configured for receiving reference signal transmitted using a first sequence; a control information receiving unit, configured for receiving control information transmitted using a second sequence; a demodulation unit, configured for demodulating the control information using the reference signal; and wherein the reference signal and the UL control information are staggered-multiplexed in frequency domain.

According to a fifth aspect of the present disclosure, there is also provided a computer-readable storage media with computer program code embodied thereon, the computer program code configured to, when executed, cause an apparatus to perform actions in the method according to any embodiment in the first aspect.

According to a sixth aspect of the present disclosure, there is further provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it provides a new solution for UL transmission and receiving in which the uplink information can be transmitted in reduced uplink symbols so as to adapt for a subframe structure with reduced uplink symbols and thus, the transmission latency can be reduced greatly.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 1 schematically illustrates UL symbols in the existing subframe structure;

FIG. 2 schematically illustrates one of possible UL symbols in newly proposed subframe structure with reduced UL symbols;

FIG. 3 schematically illustrates PUCCH patterns in the existing communication system;

FIG. 4 schematically illustrates constellation mapping for HARQ ACK/NACK.

FIG. 13 schematically illustrates a further new PUCCH structure in accordance with a further embodiment of the present disclosure;

FIGS. 14A to 14E schematically illustrates example multiplexing manners of PUCCH and DMRS in accordance with one embodiment of the present disclosure;

FIGS. 15A to 15F schematically illustrate example resource mapping manners in accordance with embodiments of the present disclosure;

FIG. 24 schematically illustrates ACH/NACK constellation mapping for one of the example cyclic-shift grouping as illustrated in FIG. 21 in accordance with one embodiment of the present disclosure;

FIG. 25 schematically illustrates a further PUCCH structure in accordance with a further embodiment of the present disclosure;

FIGS. 26A and 26B schematically illustrates another option for PUCCH design in accordance with one embodiment of the present disclosure;

FIGS. 27A and 27B schematically illustrates another possible UL region designs in accordance with another embodiment of the present disclosure;

FIGS. 28A to 28C schematically illustrates another DMRS window design in accordance with another embodiment of the present disclosure;

DETAILED DESCRIPTION OF EMBODIMENTS

Figures 5, 6:
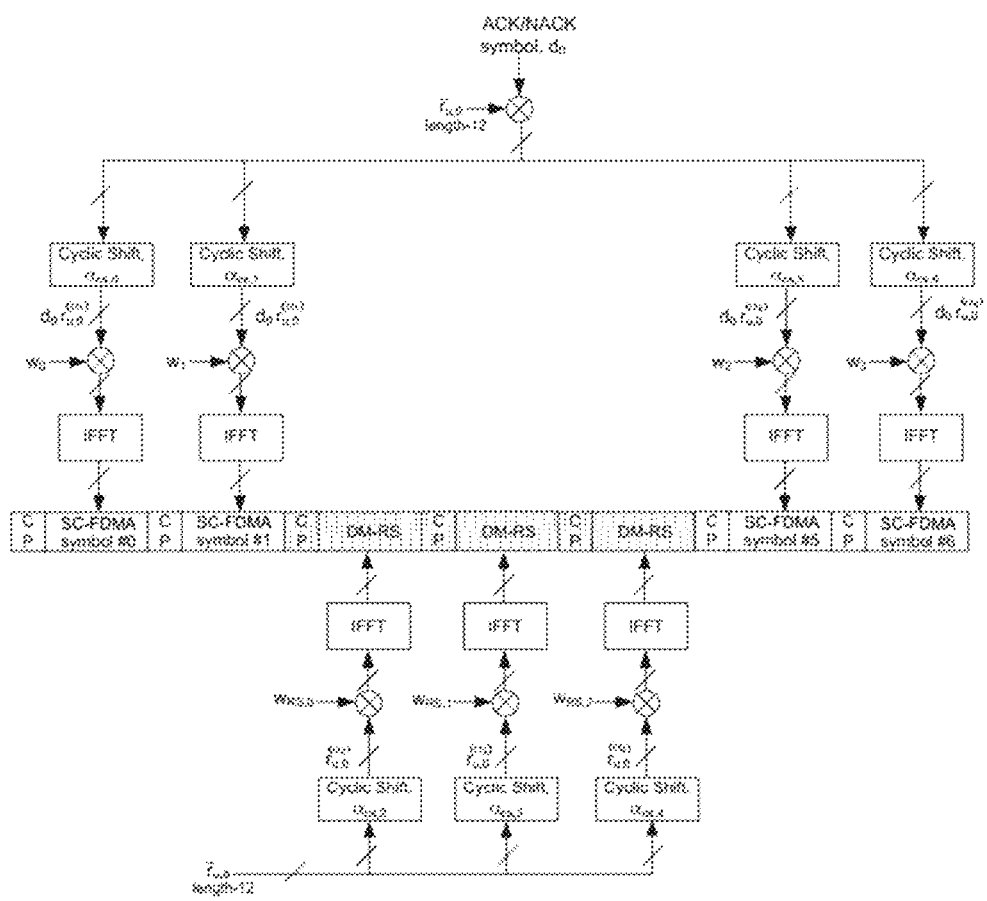
FIG. 5 schematically illustrates UL information transmission in the existing PUCCH format 1a/1b.
FIG. 6 schematically illustrates a base sequence for UL symbols.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

As mentioned hereinabove, in existing subframe, all seven symbols in a slot can be used as UL symbols. Hereinafter, PUCCH patterns in the existing communication will be first described with reference to FIGS. 3 to 7, for a better understanding of the present disclosure.

Reference is first made to FIG. 3 which illustrates PUCCH patterns in the existing communication system in more detail. In FIG. 3, there are illustrated UL subframe k and UL subframe k+8, and particularly in each of the subframes, the PUCCHs are transmitted at edges of the system bandwidth and hopped in two slots.

In the existing communication, formats for the PUCCH comprise Format 1a/1b and Format 2a/2b, wherein Format 1a/1b is used to transmit ACK/NACK of one bit or two bits, and Format 2a/2b is used to transmit uplink CQI and ACK/NACK of one bit or two bits. Usually, PUCCH bit such as ACK/NACK bit is first modulated into ACK/NACK symbol through constellation mapping. For different modulation technologies, different constellation mapping are used. FIG. 4 schematically illustrates different constellation mapping for HARQ ACK/NACK. As illustrated in FIGS. 4 and 5, for Binary Phase Shift Keying (BPSK), ACK=1 and DTX/NACK=0 are respectively mapped to −1 and +1; and for Quadrature Phase Shift Key (QPSK), (ACK/NACK)=11, (ACK/NACK)=00, (ACK/NACK)=10, and (ACK/NACK)=01 are mapped to +1, −1, +j, −j.

FIG. 5 schematically illustrates UL information transmission in the existing PUCCH format 1a/1b. As illustrated in FIG. 5, after modulated into ACK/NACK symbols through constellation mapping, ACK/NACK symbols will be multiplied with a base sequence with a length of 12. The base sequence is illustrated in FIG. 6. The base sequence will be shifted by using different cycle shift and further be multiplied with an OCC sequence, as illustrated in FIG. 5. The resulting signal will be further processed through Inverse Fast Fourier Transform (IFFT) so as to form Single-carrier Frequency-Division Multiple Access (SC-FDMA) symbols #0, #1, #5 and #6. On the other hand, the base sequence shifted by using different cycle shift will be multiplied with the OCC sequence and the resulting signals are processed by IFFT, thereby forming DM-RS symbols. In other word, the forming of DMRS and the PUCCH is substantially similar except that no NACK symbol $d_0$ is multiplied for DM-RS symbols.

Figure 7:
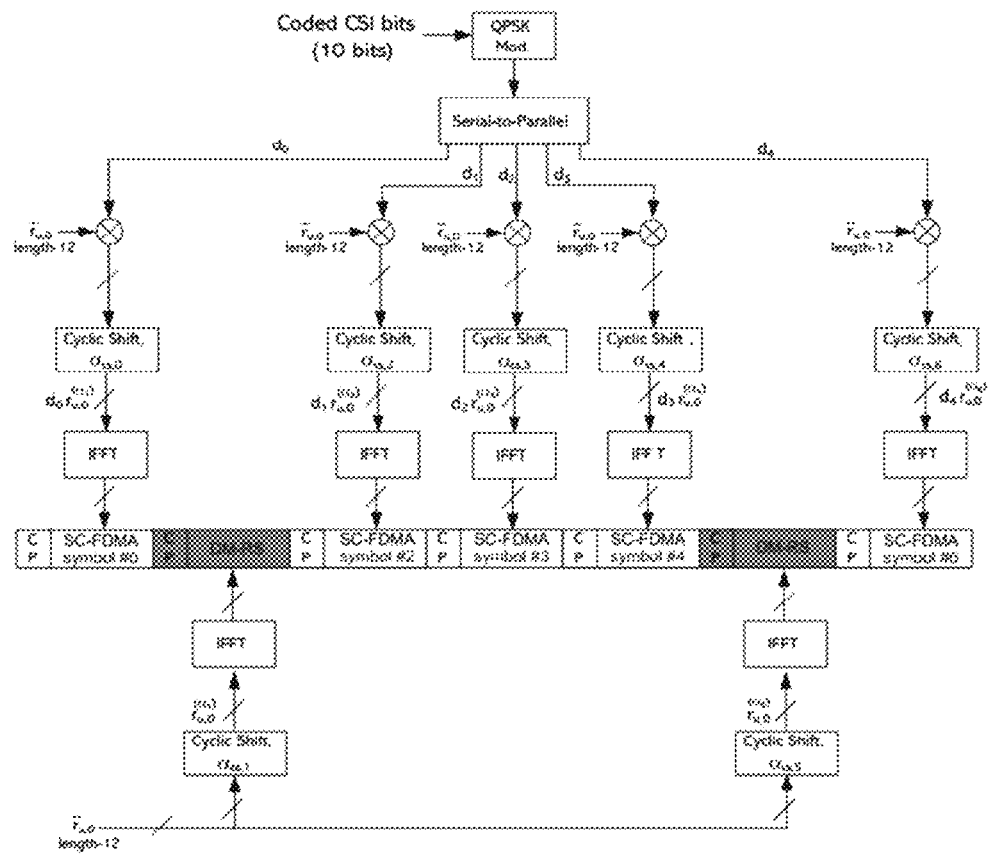
FIG. 7 schematically illustrates UL information transmission in the existing PUCCH format 2a/2b.

FIG. 7 schematically illustrates PUCCH patterns in the existing PUCCH format 2a/2b. The PUCCH pattern in FIG. 7 is similar to that as illustrated in FIG. 5, except that OCC sequence is not used and after QPSK modulation, coded CSI bits (10 bits) are converted into five data d0 to d5 through a serial-to-parallel processing and PUCCH symbols and DMRS symbols have different positions.

As mentioned hereinbefore, in a case that reduced UL symbols are used, the existing PUCCH patterns cannot be used, and thus a new PUCCH design and new UL control information transmission and receiving solutions are provided in the present disclosure, which will be described in detail with reference to FIGS. 8 to 32.

Figure 8:
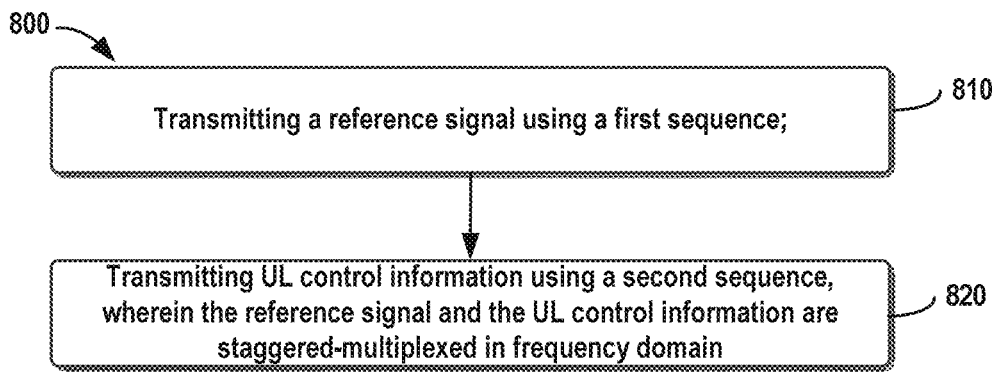
FIG. 8 schematically illustrates a flow chart of a method of transmitting UL information in accordance with one embodiment of the present disclosure.

FIG. 8 schematically illustrates a flow chart of a method of transmitting UL information in accordance with one embodiment of the present disclosure. As illustrated in FIG. 8, first at step 810, the reference signal is transmitted using a first sequence and step 820, the UL control information is transmitted using a second sequence and particularly, the reference signal and the UL control information are staggered-multiplexed in frequency domain.

Figure 9:
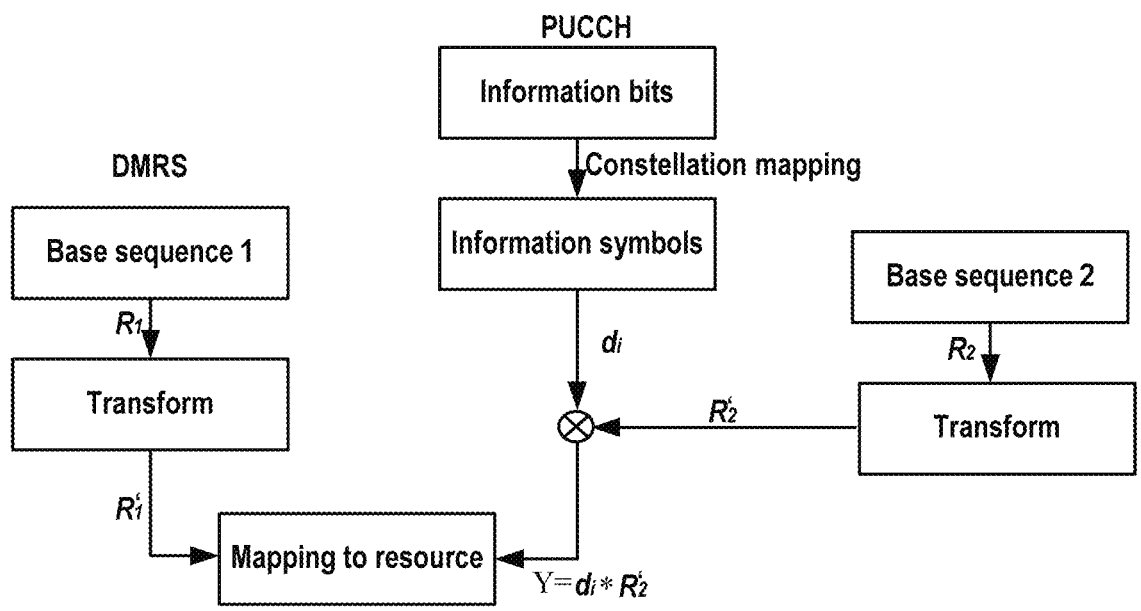
FIG. 9 schematically illustrates a diagram of DMRS and PUCCH information transmission in accordance with one embodiment of the present disclosure.

For a better understanding of the present disclosure, FIG. 9 further illustrates a diagram of DMRS and PUCCH information transmission in accordance with one embodiment of the present disclosure. As illustrated in FIG. 9, for DMRS, a base sequence 1 with N-length is first transformed to $R'_1$ through transformation such as cyclic shifting or phase rotation and then is mapped to physical resources. At the same time, the PUCCH information bits are first mapped to information symbols through any of constellation mappings such as illustrated in FIG. 4. Then information symbols $d_i$ are further multiplied with a sequence $R'_2$ which is transformed from base sequence 2 with M-length, for example cyclic shifted. Then the resulting Y is then mapped to physical resources.

Figure 10:
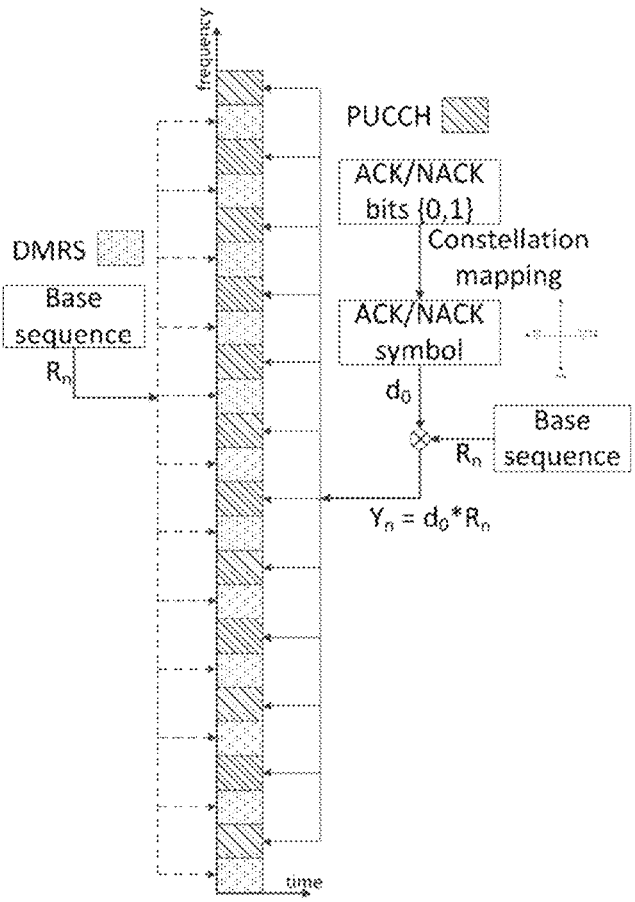
FIG. 10 schematically illustrates an example new PUCCH structure in accordance with one embodiment of the present disclosure.

The PUCCH information will be transmitted with DMRS. When mapping to resource, the reference signal and the UL control information are staggered-multiplexed in frequency domain, as illustrated in FIG. 10 which illustrates an example new PUCCH structure in accordance with one embodiment of the present disclosure. As illustrated in FIG. 10, the PUCCH and the DMRS share the same base sequence with a length of 12, for example as illustrated in FIG. 6. The PUCCH (for example ACK/NACK) bits {0, 1} are first modulated into PUCCH symbol after constellation mapping so as to obtain the PUCCH symbol $d_0$. The constellation mapping may be performed in accordance with those illustrated in FIG. 4. The PUCCH symbol is then modulated on the base sequence which is also used for DMRS. The PUCCH symbol $Y_n$ modulated on the base sequence can be expressed as:

$$Y_n = d_0 \cdot R_n, \quad n=0,1,\ldots,11$$

wherein $Y_n$ indicates resulting symbol after modulation, $d_0$ indicates the PUCCH symbol after constellation mapping; and $R_n$ indicates the base sequence. Thus, for the PUCCH, the total number of resource elements is 24.

Figures 11, 12:
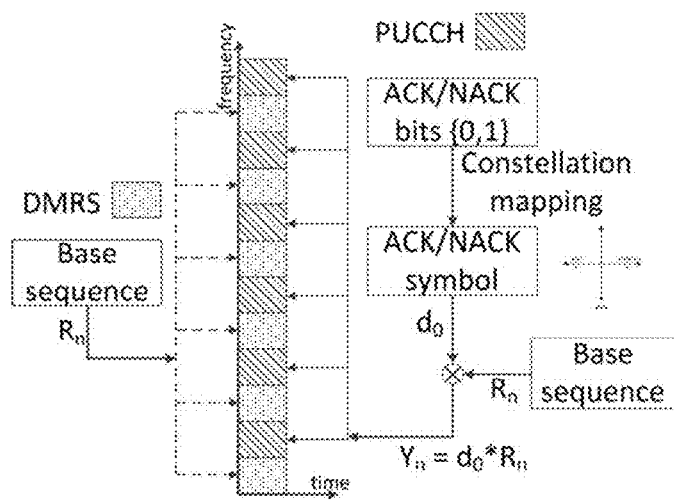
FIG. 11 schematically illustrates another base sequence which can be used for the DMRS and PUCCH information in accordance with one embodiment of the present disclosure.
FIG. 12 schematically illustrates another new PUCCH structure in accordance with another embodiment of the present disclosure.

FIG. 11 schematically illustrates another base sequence which can be used for the DMRS and PUCCH information in accordance with one embodiment of the present disclosure. The orthogonal sequences $R_n$ (i) may be based on OCC/DFT sequence, it has a length of 6 and there are six orthogonal sequences with an index ranging from 0 to 5. Thus, it is clear that, the sequence for DMRS and the PUCCH is not limited to that illustrated in FIG. 6 or 11; in fact, any suitable sequence can be used as long as the frequency orthogonality is ensured.

FIG. 12 illustrates another new PUCCH structure in accordance with another embodiment of the present disclosure, which can be used with the base sequence as illustrated in FIG. 11. As illustrated in FIG. 12, the PUCCH and the DMRS also share the same base sequence, but the base sequence has a length of 6, for example as illustrated in FIG. 11. Similarly, the PUCCH (for example ACK/NACK) bits {0, 1} are first modulated into PUCCH symbol after constellation mapping so as to obtain the PUCCH symbol $d_0$. The constellation mapping may also be performed in accordance with those illustrated in FIG. 4. The PUCCH symbol is then modulated on the base sequence with a length of 6. The PUCCH symbol $Y_n$ modulated on the base sequence can be expressed as:

$$Y_n = d_0 \cdot R_n(i), \quad i=0,1,\ldots,5$$

wherein $Y_n$ indicates resulting symbol after modulation, $d_0$ indicates the PUCCH symbol after constellation mapping; and $R_n$ (i) indicates the sequence with an index i, as illustrated in FIG. 11.

The PUCCH symbol will be transmitted with the DMRS and staggered-multiplexed therewith in the frequency domain as illustrated in FIG. 12. Thus, in such a case, for the PUCCH, the total number of resource elements is 12.

In a further embodiment of the present disclosure, the DMRS uses the base sequence with a length of 12, for example that illustrated in FIG. 6; while the PUCCH uses a different sequence, for example those illustrated in FIG. 11. FIG. 13 schematically illustrates a further new PUCCH structure in accordance with a further embodiment of the present disclosure, which can be used in the embodiment in which sequence with different lengths are used. In such a case, the PUCCH symbol $Y_n$ modulated on the base sequence can be expressed as:

$$Y_n = d_0 \cdot S(i), i=0,1,\ldots,5$$

wherein $Y_n$ indicates resulting symbol after modulation, $d_0$ indicates the PUCCH symbol after constellation mapping; and $S(i)$ indicates the base sequence with an index i for the PUCCH, as illustrated in FIG. 11. In this case, for the PUCCH, two PUCCH symbols will be transmitted with the DMRS and staggered-multiplexed therewith and the total number of resource elements is 24.

Therefore, in FIG. 9, the two base sequences $R_1$ and $R_2$ as illustrated can be the same sequence. For example, the PUCCH can use the base sequence for DMRS as illustrated in FIG. 6 and FIG. 11. In addition, the base sequence $R_1$ and the base sequence $R_2$ can share the base sequence. As another option, the two basis sequence can be different ones. For example, the base sequence $R_2$ may be different root sequence of the base sequence $R_1$. In addition, two base sequences $R_1$ and $R_2$ can have same lengths i.e., M=N; it may or different lengths, i.e., M≠N. The sequence $R'_1$ for DMRS (the first sequence) can be the same as the base sequence $R_i$, or the sequence $R'_1$ can be transformed from the base sequence $R_1$ through cyclic shift or phase rotation. The sequence $R'_2$ for modulating PUCCH symbol (the second sequence) can be the same as the base sequence $R_2$, or the sequence $R'_1$ can be transformed from the base sequence $R_1$ through cyclic shift or phase rotation.

Figure 14D:
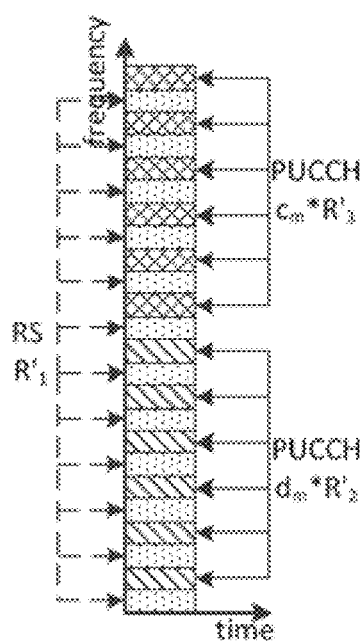
Figure 14E:
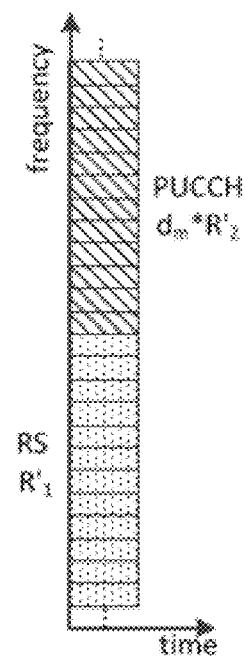

In embodiments of the present disclosure, the PUCCH and the RS can be stagger-multiplexed in many different manners. For a purpose of illustration, FIGS. 14A to 14E illustrate several example multiplexing manners in the frequency domain. As illustrated in FIG. 14A, the RS and PUCCH can be staggered-multiplexed every RE, that is to say, one RS is for one PUCCH. In FIG. 14B, the RS and PUCCH can be staggered-multiplexed every k REs, that is to say, one RS is for k PUCCHs, wherein $c_i$ and $d_m$ are modulated symbols which can come from the same UE or different UE. FIG. 14C illustrates another example multiplexing manners, which is similar to that in FIG. 14B, but in FIG. 14C, the PUCCHs are not continuous in frequency but separated by the DMRS. FIG. 14D further illustrates a further example multiplexing manner, in which the RS and the PUCCH use sequences with different lengths and wherein one PUCCH uses one RS. FIG. 14E illustrates a further example multiplexing manners in accordance with a further embodiment of the present disclosure. In FIG. 14E, the PUCCHs are not separated by any DMRS but continuous in frequency, which means DMRSs are also continuous in frequency.

Hereinafter, for a purpose of illustration, common expression for one UL symbol transmission will be described wherein $d_{mn}$ (m>=0, n>=0) denotes the modulated symbol of information bit. For a given m or n, the symbols can be same, that is to say, $$d_{mi} = d_{mj} \text{ or } d_{in} = d_{jn}$$

In addition, symbols can also have different phase rotation, i.e., $$d_{mi} = e^{jk\theta} * d_{mj} \text{ or } d_{in} = e^{jk\theta} * d_{jn}$$

The symbols can have different orders. For example, one has an increasing order, and the other has a decreasing order, as illustrated in the following:

$$d_{00} = d_{1n}, d_{01} = d_{1n-1}, \ldots d_{0n} = d_{10}.$$

Alternatively, the symbols can also be totally different.

For RS sequence $R_{mn}$ (m>=0, n>=0), the sequence can also be same for a given m or n. In another embodiment of the present disclosure, the RS sequence $R_{mn}$ can be different for a given m or n. Besides, the symbols may also be based on the same base sequence and have different phase rotation or cycle shift values.

Figure 15A:
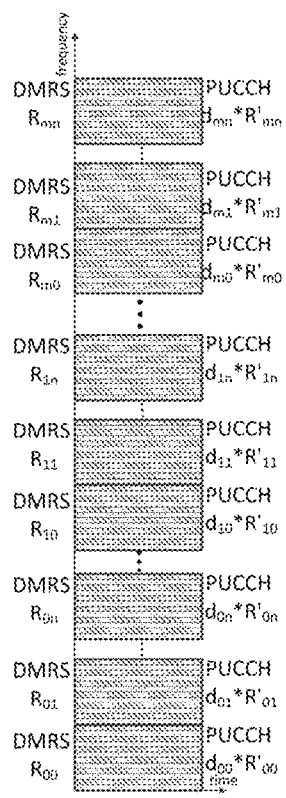

FIGS. 15A to 15F schematically illustrate example resource mapping manners in accordance with embodiments of the present disclosure. As illustrated in FIG. 15A, both DMRS sequences and the modulated PUCCH based on the sequence are mapped in sequence, i.e. the modulated PUCCH symbols are mapped in an order of $d_{00}, d_{01} \ldots d_{0n}, d_{10}, d_{11}, \ldots d_{1n}, \ldots, d_{m0}, d_{m1}, \ldots d_{mn}$ and the DMRS sequences are mapped in order of $R_{00}, R_{01} \ldots R_{0n}, R_{10}, R_{11}, \ldots R_{1n}, \ldots d_{m0}, d_{m1}, \ldots d_{mn}$. While in FIG. 15B, the DMRS sequences and the modulated PUCCH based on the sequence are mapped from edges of band.

In embodiments of the present disclosure, PUCCH with DMRS can be located on the physical resource blocks (PRB) with a pre-determined order in pre-defined RBs. For example, different PUCCH symbols can be located in different PRBs as illustrated in FIG. 15C. PUCCH symbols can be mapped on both edges of the system band for frequency diversity, as illustrated in FIG. 15D. In FIG. 15D, DMRS $R_0$ and PUCCH $d_0*R'_1$ are mapped to a first edge of the system band; DMRS $R_1$ and the PUCCH $d_1*R'_1$ are mapped to a second edge of the system band, DMRS $R_2$ and the PUCCH $d_2*R'_2$ are mapped to the first edge of the remaining system band, DMRS $R_3$ and the PUCCH $d_3*R'_3$ are mapped to the second edge of the remaining system, and so on.

Figure 15B:
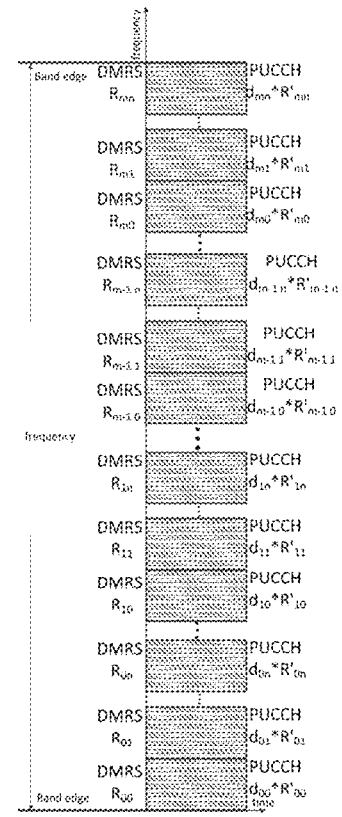

In another embodiment of the present disclosure, duplicates of PUCCH with DMRS can be located on PRBs. For example, as illustrated in FIG. 15E, DMRS $R_{00}, R_{10}$, to $R_{m0}$ and PUCCH $d_0*R'_{00}, d_1*R'_{10}$, to $d_m*R'_{m0}$ are first mapped on a first edge of the system band, DMRS $R_{01}, R_{11}$, to $R_{m1}$ and PUCCH $d_0*R'_{01}, d_1*R'_{11}$, to $d_m*R'_{m1}$ are then mapped from the second opposite edge of the system band, and so on. Besides, FIG. 15F also illustrates another resource mapping manner, DMRS $R_{00}, R_{10}$, to $R_{m0}$ and PUCCH $d_0*R'_{00}, d_1*R'_{10}$, to $d_m*R'_{m0}$ are first mapped from on a first edge of the system band which is similar to FIG. 15E, DMRS $R_{m1}, R_{m-11}$, to $R_{01}$ and PUCCH $d_0*R'_{01}, d_1*R'_{m-1}$, to $d_m*R'_{01}$ are then mapped from the second opposite edge of the system band which is in a different order from FIG. 15E, and so on. Besides, the duplicates of PUCCH in different PRBS can also be located on PRBs in a way as illustrated in FIG. 15A or 15B.

It shall also be notice that the mapping order (e.g. hopping) can be changed with a pre-defined order in different symbols/subframe/PRBs.

Hereinbefore, the present disclosure is mainly described with reference to one UL symbol design. In fact, it can also be used in a frame design with L UL symbols, which means the subframe can have reduced UL symbol but the number of UL symbols is larger than 1.

Figure 16A:
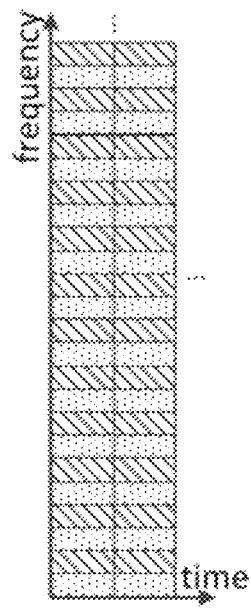
FIG. 16A-16D schematically illustrates example multiplexing manners of PUCCH and DMRS in accordance with one embodiment of the present disclosure.
Figure 16B:
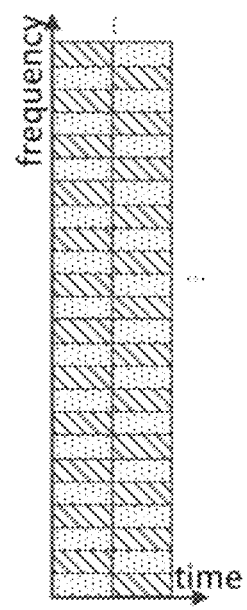
Figure 16C:
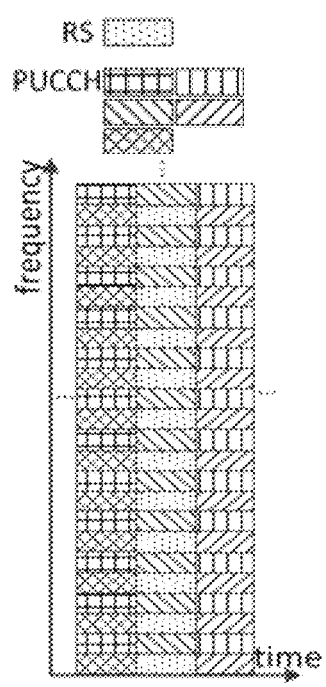

For each of the L UL symbols, the PUCCH and DMRS can be staggered-multiplexed in the same way, for example as illustrated in FIG. 16A. Or alternatively, there may be hopping in two symbols as illustrated in FIG. 16B. In addition, for M(1=<M<=L) symbols within the L symbols, PUCCH and RS sequence can be staggered-multiplexed every one ore more RE in frequency; other (L-K) symbols, can all be used for PUCCH, as illustrated in FIG. 16C.

Figure 16D:
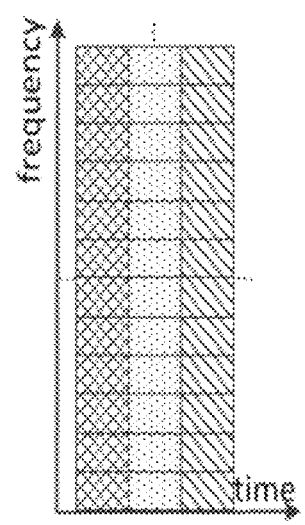

In another embodiment of the present disclosure, the PUCCH and RS sequence can be staggered-multiplexed in time. In other words, M (1<=M<=L) symbols can be used for RS (can be contiguous or staggered), others can be used for PUCCH as illustrated in FIG. 16D.

Figure 17A:
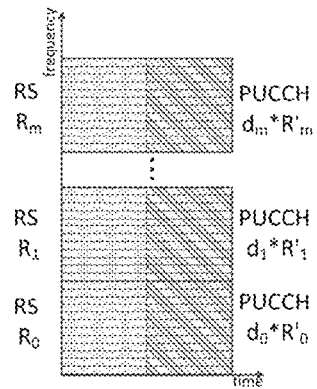
FIG. 17A to 17D schematically illustrate example resource mapping manners in accordance in accordance with one embodiment of the present disclosure.
Figure 17B:
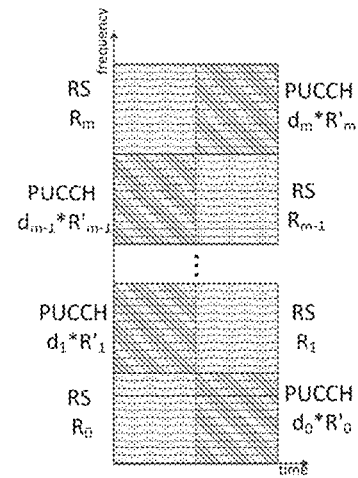
Figure 17C:
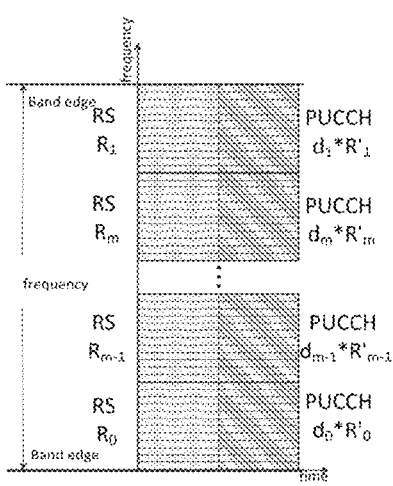
Figure 17D:
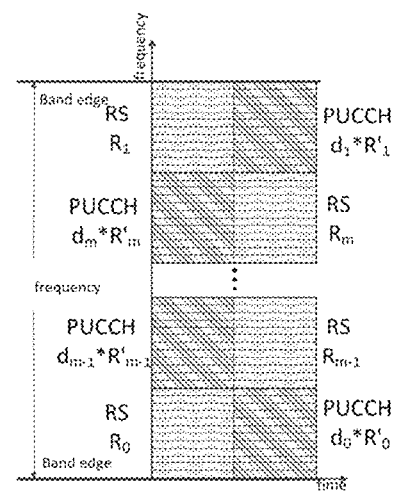
Figure 18A:
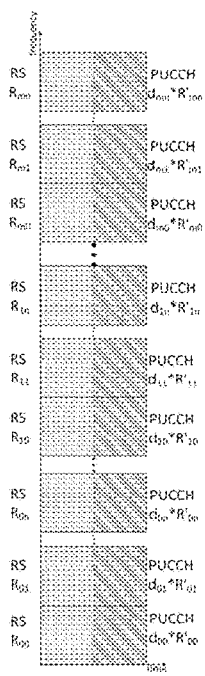
FIG. 18A to 18D schematically illustrate example resource mapping manners for common expression in accordance in accordance with one embodiment of the present disclosure.
Figure 18B:
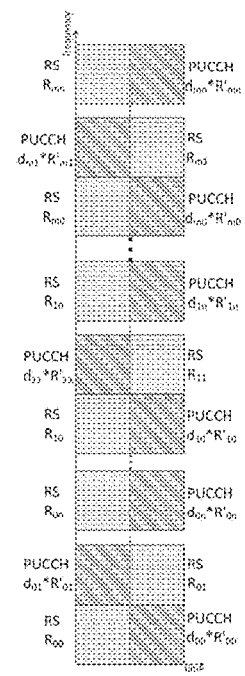
Figure 18C:
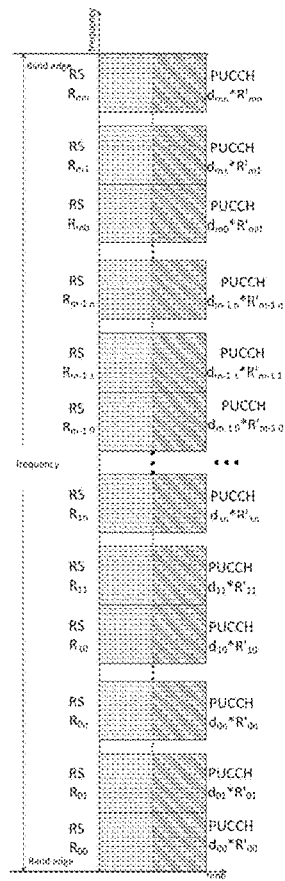
Figure 18D:
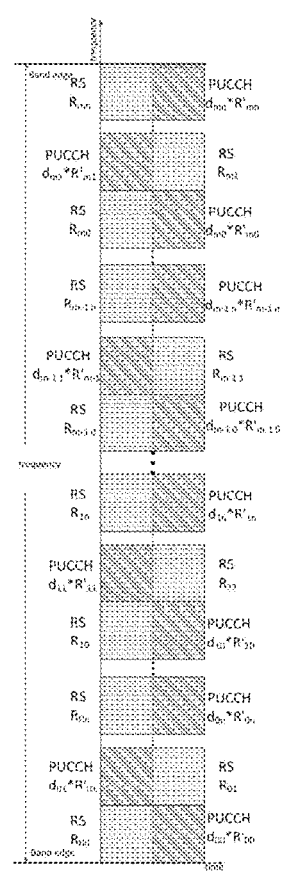

FIGS. 17A and 17B illustrate the mapping of PUCCH and RS in sequence and FIGS. 17C and 17D illustrate the mapping of PUCCH and DMRS from the edges of the system band. From FIGS. 17A and 17B, it can be seen that for L UL symbols, PUCCH and DMRS can be multiplexed in time and be located on PRBs with predetermined order. For example, the PUCCH with DMRS can be mapped in sequence as illustrated in FIG. 17A or mapped from both edges of the system band as illustrated in FIG. 17C. Moreover, the duplicates of PUCCH with DMRS can also be located on PRBs. As another alternative, PUCCH and DMRS may be hopped in symbols as illustrated in FIGS. 17 B and 17D. In addition, only for a purpose of illustration, FIGS. 18A to 18D illustrate the mapping of PUCCH and DMRS in sequence and from the edges of the system band for common expression.

Figure 19:
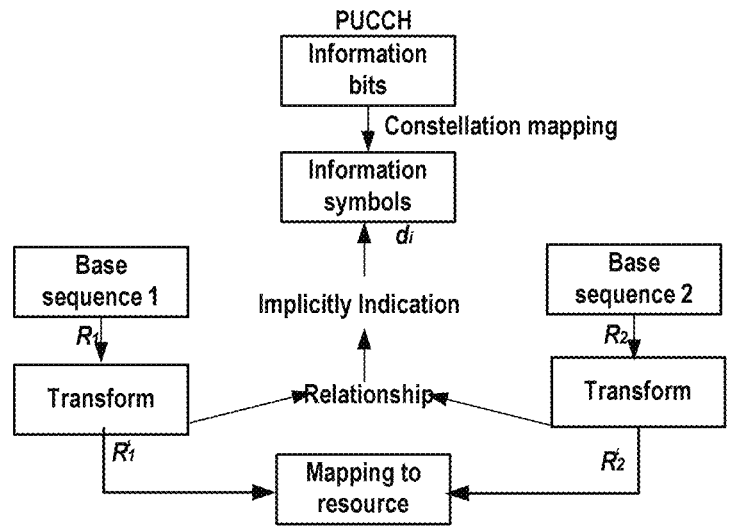
FIG. 19 schematically illustrates a block diagram of DMRS and PUCCH information transmission in accordance with another embodiment of the present disclosure.

FIG. 19 schematically illustrates a block diagram of DMRS and PUCCH information transmission in accordance with another embodiment of the present disclosure. In the embodiment of the present disclosure, the PUCCH information symbols are not modulated based on the second sequence but are indicated by the relationship between the first sequence and the second sequence to be transmitted. As illustrated in FIG. 19, for DMRS, a base sequence 1 with N-length is first transformed to $R'_1$ through transformation such as cyclic shifting or phase rotation and then is mapped to physical resources. At the same time, the PUCCH information bits are first mapped to information symbols through any of constellation mappings such as illustrated in FIG. 4. A sequence $R'_2$ is transformed from base sequence 2 with M-length, for example is a cyclic shifted or phase-rotated sequence from base sequence 2. Then the resulting sequence $R'_2$ is then mapped to physical resources. In this solution, the information symbols $d_i$ are not further multiplied with the sequence $R'_2$ like that in FIG. 9; instead, the information symbols $d_i$ are implicitly indicated by the relationship between the sequence $R'_1$ and the sequence $R'_2$. Then, the $R'_2$ is transmitted with DMRS sequence $R'_1$.

Figure 20:
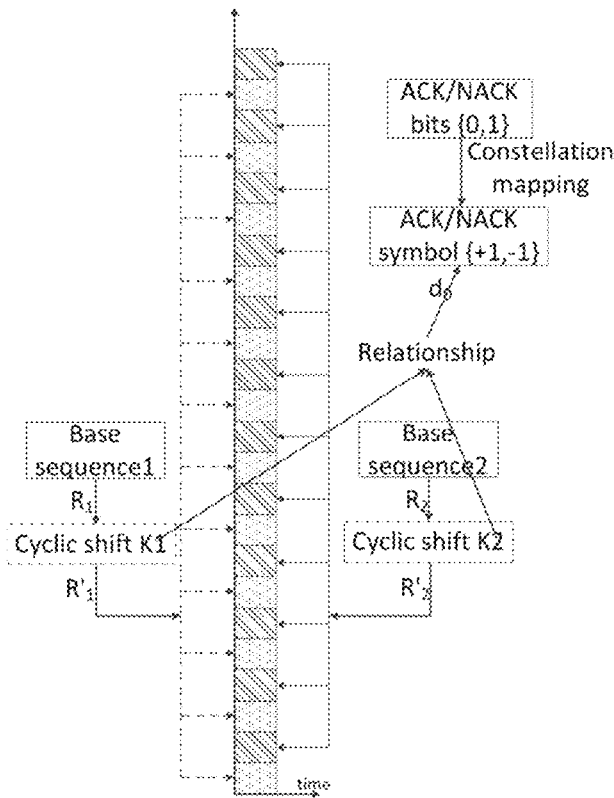
FIG. 20 schematically illustrates a new PUCCH structure in accordance with another embodiment of the present disclosure.

FIG. 20 schematically illustrates a new PUCCH structure in accordance with one embodiment of the present disclosure, wherein the information symbols $d_i$ are implicitly indicated by the relationship between the sequence $R'_1$ and the sequence $R'_2$ and the reference signal and the UL control information such as ACK/NACK are staggered-multiplexed in the frequency domain.

As illustrated in FIG. 20, in this embodiment of the present disclosure, the base sequences 1 and 2 have the same length of N. The two sequences $R_1$ and $R_2$ may be different, or transformed, cyclic shifted or phase-rotated from the same base sequence. The base sequences 1 and 2 may be for examples the base sequence as illustrated in FIG. 6. However, it is to be appreciated that other base sequence is also possible. The PUCCH (for example ACK/NACK) bits {0, 1} are first modulated into PUCCH symbol after constellation mapping, for example as BPSK {+1, −1}. Then the modulated symbol is implicitly indicated by the relationship of the sequences $R'_1$ and $R'_2$. The relationship may be for example reflected by cyclic shift which can be expressed as below:

$$R'_n = e^{j\alpha n} R_n, \ 0 \leq n \leq 11 \ \alpha = 2\pi k/12, \ 0 \leq k \leq 11$$

For the sequences $R'_1$ and $R'_2$, they can use different cycle shifts, which may be expressed by the following equations:

$$e^{j2\pi k1/12} R_n, \ e^{j2\pi k1/12} R_n$$

wherein k1 and k2 are the CS index of $R_n$. If k1−k2=6, it indicates that the information symbol is +1; if K1−K2=−6, it indicates that the information symbol is −1. In such a way, the PUCCH information symbol can be implicitly indicated by the relationship between the sequences $R'_1$ and $R'_2$. In such a case, the total number of REs for implicating transmitting PUCCH is 24 (2N).

The PUCCH mapping and multiplexing can be similar to the embodiment as illustrated in FIG. 9 and thus for details, one may refer FIGS. 10 to 18.

Figures 21, 22, 23:
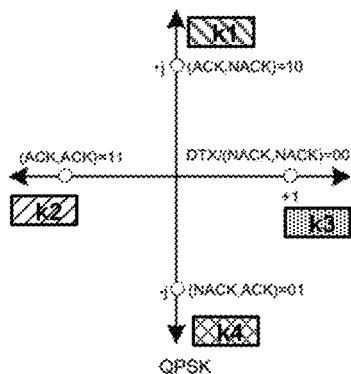
FIG. 21 schematically illustrates a corresponding relationship between the modulation symbol and a sequence group in accordance with one embodiment of the present disclosure.
FIG. 22 schematically illustrates constellation mapping in accordance with one embodiment of the present disclosure.
FIG. 23 schematically illustrates cyclic-shift grouping in accordance with one embodiment of the present disclosure.

FIG. 21 to FIG. 22 further illustrate a further possible solution for DMRS and PUCCH information transmission in accordance with a further embodiment of the present disclosure, in which sequences are divided into k different groups and the modulated PUCCH symbols are indicated by the predefined groups.

The PUCCH information bits are denoted by $d_i$, which are obtained after constellation mapping. If a modulation order is M, it resulting totally $2^M$ symbols. There are Q sequences which can be used. The Q sequences are grouped into K groups (K=Q/M), each group kj corresponds to one modulation symbol, as illustrated in FIG. 21. Thus, different sequence groups are used for different modulation symbols.

FIG. 22 further schematically illustrates constellation mapping for QPSK in accordance with one embodiment of the present disclosure. As illustrated in FIG. 22, four sequence groups k1 to k4 are mapped to four NACK/ACK symbols.

The Q sequences may be different base sequences, different cyclic shifts of one or several base sequence, or different transformation of one or several base sequences, for example through a phase rotation (R1=$e^{j\Theta}$*R2). These sequences can be staggered or continuously mapped in frequency or time domain. The total number of REs for implicitly transmitting PUCCH information is N.

FIGS. 23 to 24 illustrate a specific embodiment of cyclic-shift grouping in accordance with one embodiment of the present disclosure. In FIG. 23, there are illustrated two different cyclic shift grouping. As illustrated in FIG. 23, 12 cyclic shifts are divided into four groups which are illustrated by different patterns. The 12 cyclic shifts can be expressed as:

$$R_n e^{j\pi k} R_n, \ 0 \leq n \leq 11 \ \alpha = 2\pi k 12, \ 0 \leq k \leq 11$$

In one possible grouping, cyclic shifts 0 to 2 are divided into the first group, cyclic shifts 3 to 5 are divided into the second group, cyclic shifts 6 to 8 are divided into the third group, and cyclic shifts 9 to 11 are divided into the fourth group. FIG. 24 schematically illustrates ACK/NACK constellation mapping corresponding to the example cyclic-shift grouping as illustrated in FIG. 21 in accordance with one embodiment of the present disclosure. As illustrated in FIG. 24, the four cyclic shift groups are respectively mapped to QPSK {+1, −1, +j, −j}.

Besides, FIG. 23 also illustrates another possible grouping, in which cyclic shifts 0, 4, 8 are divided into the first group, cyclic shifts 1, 5, 9 are divided into the second group, cyclic shifts 2, 6, 10 are divided into the third group, cyclic shifts 3, 7 to 11 are divided into the fourth group. It is to be appreciated that, in addition to the example possible groupings, the cyclic shifts can be divided in any other suitable manner. In such a way, different cyclic shift groups can be used to indicate different PUCCH symbols. Moreover, different UE may use different cyclic shifts in a cyclic shift group to indicate their own PUCCH symbols. In a case the base sequence is 12, the total number of REs for implicitly transmitting PUCCH is 12.

FIG. 25 schematically illustrates a new PUCCH structure in accordance with one embodiment of the present disclosure. As illustrated, the PUCCH information symbol is implicitly indicated by R'n with a predetermined transformation such phase rotation (PR) or cyclic shift (CS). The R'n will be mapped to physical resource and transmitted in the UL symbol.

It is to be appreciated that the PUCCH information can be mapped to L symbols (L>=1) wherein L can be pre-defined value. The L can be dynamically or semi-statically informed by a base station, such as eNB; and in such a case, it may provide bits in dynamic control region or RRC message. In addition, the PUCCH resource index can be also pre-defined or informed dynamically or semi-statically by the eNB. It is to be noted that sequences and/or mapping orders can be different or same in PRBs or symbols; and OCC, phase rotation, etc. can be used in PRBs or symbols.

Additionally, subcarrier spacing for PUCCH can be different with other symbols. It is also possible to use a new modulation; for example, constant modulus can be used, such as 8PSK for maintaining low PAPR in one or several symbols. Moreover, the sequence length for PUCCH can be adapted with different payload.

In an embodiment of the present disclosure, PUCCH can be classified into groups, some are modulated on ZC/PN sequence or expressed with cyclic shift, and others are expressed with different sequences or not modulated on a sequence as illustrated in FIGS. 26A and 26B. Usually, the important PUCCH information can be modulated with DMRS sequences to obtain accuracy results. For example, ACK/NACK is more important than CSI, and thus, it may be modulated on ZC/PN sequence or expressed with cyclic shift. By contrast, the CSI is less important and thus, CSI can be not modulated on ZC/PN sequence. The ZC/PN sequence for ACK/NACK can be used as demodulation RS for CSI which may obtain additional benefits for some PUCCH without an available reference signal. In a case, the UL control information and the reference signal might be transmitted with different time periods, in another case, not all UL control information is transmitted together with a reference signal. However, in either of the two cases, there might some PUCCH without an available reference signal. In such a case, it is possible to use previous reference signal, for example the one which is nearest thereto. As an alternative option, it may also use a sequence for previous control information since the received sequence per se carries the channel information, which may be used as RS for other PUCCH. In a special embodiment of the present disclosure, the reference signal for UL control information without an available reference signal can be determined dependent on a time distance from the previous reference signal and the previous control information to the UL control information without an available reference signal. That is to say, if the PUCCH has a shorter time distance from the previous PUCCH than the previous RS, it may use the sequence for the previous PUCCH as the reference signal for the PUCCH. Thus, it is possible to obtain PUCCH information with a high accuracy. This solution can be used with any of PUCCH transmission solution as mentioned hereinabove so as to achieve higher accuracy.

FIG. 27A illustrates one possible UL region design in accordance with embodiment of the present disclosure. It is assumed that there are N symbols for UL, M symbols for UL control (PUCCH), and L symbols for DMRS (L>=0). In an embodiment of the present disclosure, one or several symbols/PRBs can be modulated on ZC/PN sequence or modulated with cyclic shift of ZC/PN sequence. As illustrated in FIG. 27A, For M symbols PUCCH, K symbols can be modulated on ZC/PN sequence or modulated with cyclic shift of ZC/PN sequence (K>=0); other M-K symbols can be any kind of control information. FIG. 27B also illustrate another possible UL region design in accordance with embodiment of the present disclosure, wherein there is one symbol for DMRS and one symbol for modulated PUCCH. DMRS and/or PUCCH symbols can be continuous or staggered. It is to be noted that position of DMRS, PUCCH and data can be different from those illustrated in FIGS. 27A and 27B.

Figure 28C:
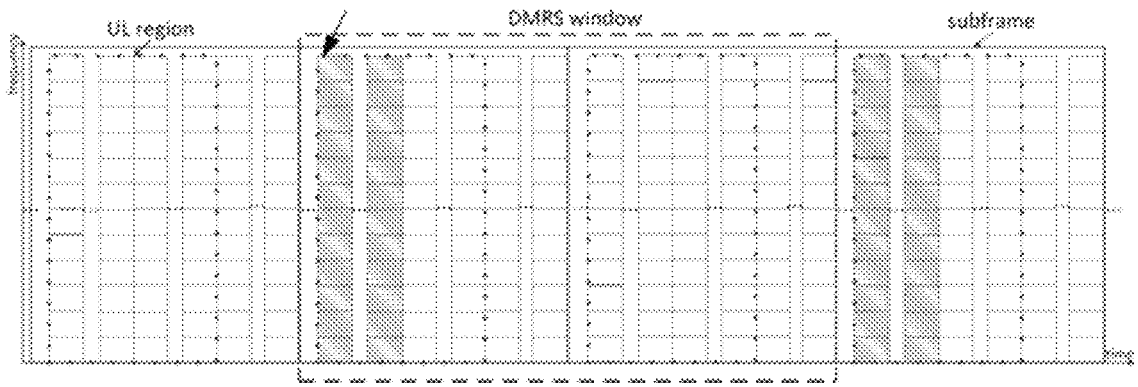

Besides, in embodiments of the present disclosure, there can be provided one or more DMRS in a window time for demodulation as illustrated in FIGS. 28A to 28C. In an embodiment of the present disclosure, in the window time, there can be several subframes as illustrated in FIG. 28A, or several symbols as illustrated in FIG. 28B or it may be a hybrid of the previous solutions as illustrated in FIG. 28C. The window time value can be pre-defined or dynamically/semi-statically informed.

Hereinbefore, description is mainly made to the solution of UL information transmission. In the present disclosure, there is also provided a method of receiving UL information, which will described with reference FIG. 29.

Figure 29:
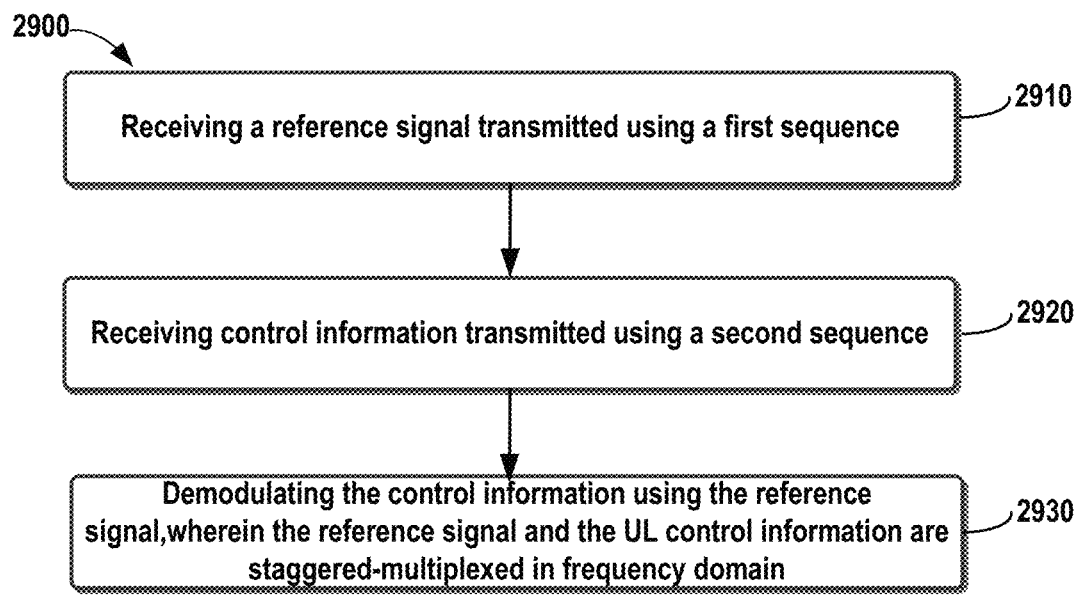
FIG. 29 schematically illustrates a flow chart of a method of receiving UL information in accordance with one embodiment of the present disclosure.

As illustrated in FIG. 29, the method 2900 may start from step 2910, in which a reference signal transmitted using a first sequence is first received. The first sequence for the reference signal may have a base sequence as illustrated in FIG. 6, may be one of the sequences as illustrated in FIG. 11 or any other sequence with frequency-domain orthogonality. The first reference signal can be a sequence transformed from a base sequence through cyclic shifting, phase rotation or any other transformation. Moreover, the reference signal may be for example a DMRS signal or any other reference signal.

In step 2920, control information transmitted using a second sequence is received. Similarly, the second sequence for the control information can have a base sequence as illustrated in FIG. 6, may be one of the sequences FIG. 11, or any other sequence with frequency-domain orthogonality. The second reference signal can be a sequence transformed from a base sequence through cyclic shifting, phase rotation or any other transformation. The first sequence and the second sequence may be identical or share the same base sequence. Or alternatively, the first sequence and the second sequence have different base sequences with same or different lengths. For example, the first sequence may have the base sequence as illustrated in FIG. 6, while the second sequence may be one of the sequences as illustrated in FIG. 11. The control information may be PUCCH information, such as NACK/ACK, or CQI, PMI, RI, etc.

Next in step S2930, the control information is demodulated using the reference signal. Particularly, the reference signal and the UL control information are staggered-multiplexed in frequency domain. In one embodiment of the present disclosure, the demodulating the control information may further comprise obtaining the UL control information using channel information together with the second sequence, wherein the channel information is obtained from the reference signal by using the first sequence. That is to say, the channel information will be first obtained from the reference signal based on the first sequence and then a control information bit can be obtained by demodulating the received control information based on the channel information and the second sequence.

In another embodiment of the present disclosure, the demodulating the control information may further comprise: obtaining the second sequence using channel information, wherein the channel information is obtained from the reference signal by using the first sequence; and obtaining the control information based on a relationship between the first sequence and the second sequence. In such a case, after obtaining the channel information based on the reference signal, the second sequence can be further obtained based on the channel information, then it further determines the relationship between the first sequence and the second sequence, which implicitly indicates the control information. Therefore, in this embodiment, the information bit is transmitted in an implicit way; in other words, the information bit itself is not multiplexed with the second sequence but be implicitly indicated by the first sequence and the second sequence.

In embodiments of the present disclosure, the reference signal and the UL control information are staggered-multiplexed in many different ways. For example, the reference signal and the UL control information can be staggered-multiplexed every one resource element with one reference signal for one piece of UL control information. As another option, the reference signal and the UL control information can be staggered-multiplexed every more than one resource element with one reference signal shared by more than one piece of the UL control information.

In embodiments of the present disclosure, the UL control information and the reference signal are mapped in any suitable manner. For example, the UL control information and the reference signal can be mapped at both edges of system bandwidth. Additionally or alternatively, the UL control information and the reference signal can hop in two symbols.

In an embodiment in which the UL control information and the reference signal are transmitted with different time periods or not all UL control information is transmitted together with a reference signal, one of a previous reference signal and a sequence for previous control information can be used as a reference signal for demodulating UL control information without an available reference signal. In such a case, the method may further comprise determining the reference signal for UL control information without an available reference signal dependent on a time distance from the previous reference signal and the previous control information to the UL control information without an available reference signal.

Some details about the PUCCH design, the first sequence, the second sequence, the staggering-multiplexing, resource mapping and so on are already described in detail with reference to FIGS. 8 to 28 and thus these details will not be elaborated herein for simplification purposes and for details about them, please see the description with reference to FIGS. 8 to 28.

With embodiments of the present disclosure, it provides a new solution for UL transmission and receiving in which the uplink information can be transmitted in reduced uplink symbols so as to adapt for a subframe structure with reduced uplink symbols and thus, the transmission latency can be reduced greatly.

Figure 30:
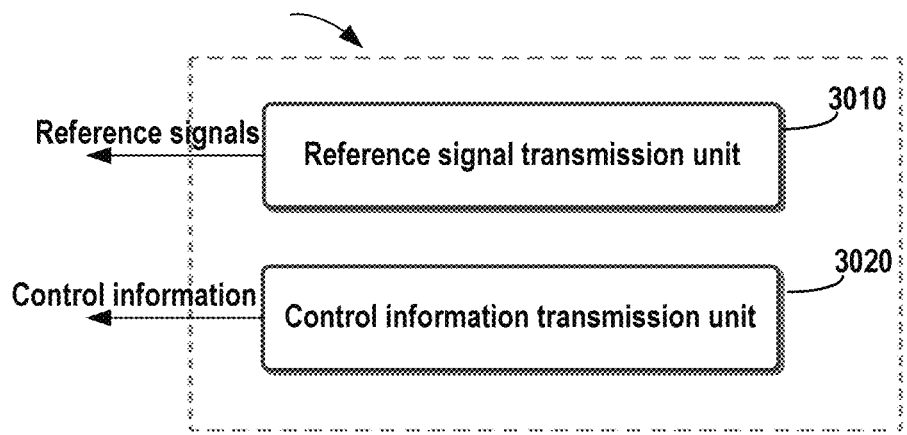
FIG. 30 schematically illustrates a block diagram of an apparatus for transmitting UL information in accordance with one embodiment of the present disclosure.

FIG. 30 schematically illustrates a block diagram of an apparatus for transmitting UL information in accordance with one embodiment of the present disclosure. As illustrated in FIG. 30, the apparatus 3000 comprises a reference signal transmission unit 3010, and a control information transmission unit 3020. The reference signal transmission unit 3010 may be configured for transmitting reference signal using a first sequence. The control information transmission unit 3020 may be configured for transmitting UL control information using a second sequence. Particularly, the reference signal and the UL control information are staggered-multiplexed in frequency domain.

In an embodiment of the present disclosure, the UL control information is modulated based on the second sequence, that it to say a bit of the UL control information will be transmitted implicitly. In another embodiment of the present disclosure, the first sequence and the second sequence may have a predetermined relationship which is used to implicitly indicate the UL control information.

In embodiments of the present disclosure, the first sequence and the second sequence are identical or share the same base sequence. Or alternatively, the first sequence and the second sequence can have different base sequences.

In embodiments of the present disclosure, the reference signal and the UL control information can be staggered-multiplexed in any suitable manner. For example, the reference signal and the UL control information can be staggered-multiplexed every one resource element with one reference signal for one piece of UL control information, or the reference signal and the UL control information can be staggered-multiplexed every more than one resource element with one reference signal shared by more than one piece of the UL control information.

In embodiments of the present disclosure, the reference signal and the UL control information can be mapped in any suitable manner. In an embodiment of the present disclosure, the UL control information and the reference signal are mapped at both edges of system bandwidth. In another embodiment of the present disclosure, the UL control information and the reference signal are hopping in two symbols.

In an embodiment of the present disclosure, the UL control information and the reference signal can be transmitted with different time periods. In another embodiment of the present disclosure, not all UL control information is transmitted together with a reference signal. In both cases, it means that there is some UL control information without an available reference signal. In such case, one of a previous reference signal and a sequence for previous control information can be used as a reference signal for UL control information without an available reference signal. In an embodiment of the present disclosure, the reference signal for UL control information without an available reference signal may be dependent on a time distance from the previous reference signal and the previous control information to the UL control information without an available reference signal.

Figure 31:
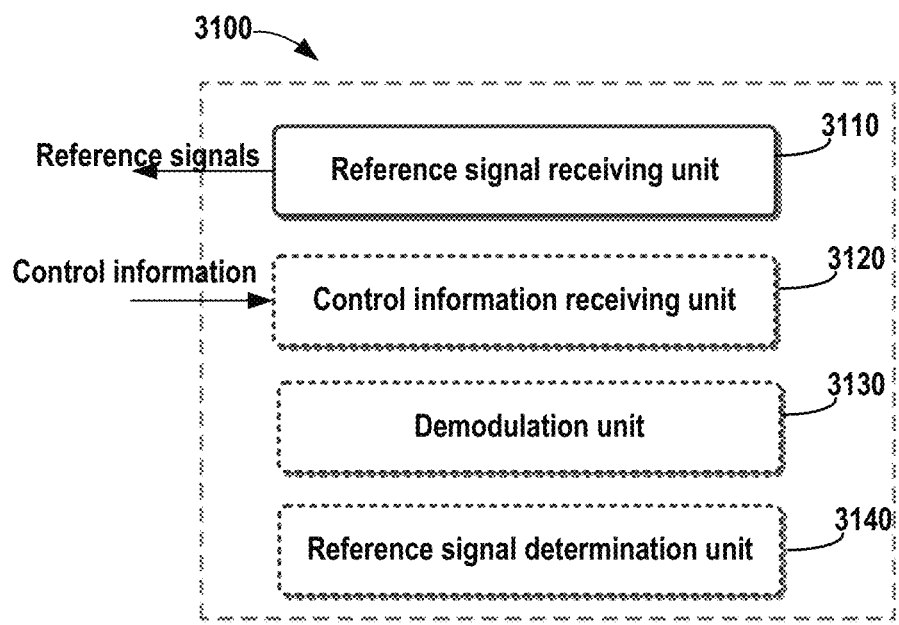
FIG. 31 schematically illustrates a block diagram of an apparatus for receiving UL information in accordance with one embodiment of the present disclosure.

FIG. 31 further illustrates an apparatus for receiving UL information. As illustrated in FIG. 31, the apparatus 3100 comprises: reference signal receiving unit 3110, and a control information receiving unit 3120 and a demodulation unit 3130. The reference signal receiving unit 3110 may be configured for receiving reference signal transmitted using a first sequence. The control information receiving unit 3120 may be configured for receiving control information transmitted using a second sequence. The demodulation unit 3130 may be configured for demodulating the control information using the reference signal. Particularly, the reference signal and the UL control information are staggered-multiplexed in frequency domain.

In an embodiment of the present disclosure, the demodulating unit 3130 is further configured for obtaining the UL control information using channel information together with the second sequence, wherein the channel information is obtained from the reference signal by using the first sequence.

In another embodiment of the present disclosure, the demodulating unit 3130 may be further configured for: obtaining the second sequence using channel information, wherein the channel information is obtained from the reference signal by using the first sequence; and obtaining the control information based on a relationship between the first sequence and the second sequence.

In an embodiment of the present disclosure, the first sequence and the second sequence can be identical or share the same base sequence. In another embodiment of the present disclosure, the first sequence and the second sequence can have different base sequences.

In an embodiment of the present disclosure, the reference signal and the UL control information are staggered-multiplexed every one resource element with one reference signal for one piece of UL control information. In another embodiment of the present disclosure, the reference signal and the UL control information are staggered-multiplexed every more than one resource element with one reference signal shared by more than one piece of the UL control information.

In an embodiment of the present disclosure, wherein the UL control information and the reference signal are mapped at both edges of system bandwidth. In another embodiment of the present disclosure, the UL control information and the reference signal can hop in two symbols.

In an embodiment of the present disclosure, one of a previous reference signal and a sequence for previous control information can be used as a reference signal for demodulating UL control information without an available reference signal. In such a case, the apparatus 3100 may further comprise: a reference signal determination unit 3140 configured for determining the reference signal for UL control information without an available reference signal dependent on a time distance from the previous reference signal and the previous control information to the UL control information without an available reference signal.

Hereinbefore, the apparatuses 3000 and 3100 are described in brief with reference to FIGS. 30 and 31. It is noted that the apparatuses 3000 and 3100 may be configured to implement functionalities as described with reference to FIGS. 8 to 29. Therefore, for details about the operations of modules in these apparatuses, one may refer to those descriptions made with respect to the respective steps of the methods with reference to FIGS. 8 to 29.

It is further noted that the components of the apparatuses 3000 and 3100 may be embodied in hardware, software, firmware, and/or any combination thereof. For example, the components of apparatuses 3000 and 3100 may be respectively implemented by a circuit, a processor or any other appropriate selection device. Those skilled in the art will appreciate that the aforesaid examples are only for illustration not for limitation.

In some embodiment of the present disclosure, apparatuses 3000 and 3100 may comprise at least one processor. The at least one processor suitable for use with embodiments of the present disclosure may include, by way of example, both general and special purpose processors already known or developed in the future. Apparatuses 3000 and 3100 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 3000 and 3100 to at least perform operations according to the method as discussed with reference to FIGS. 8 to 29 respectively.

Figure 32:
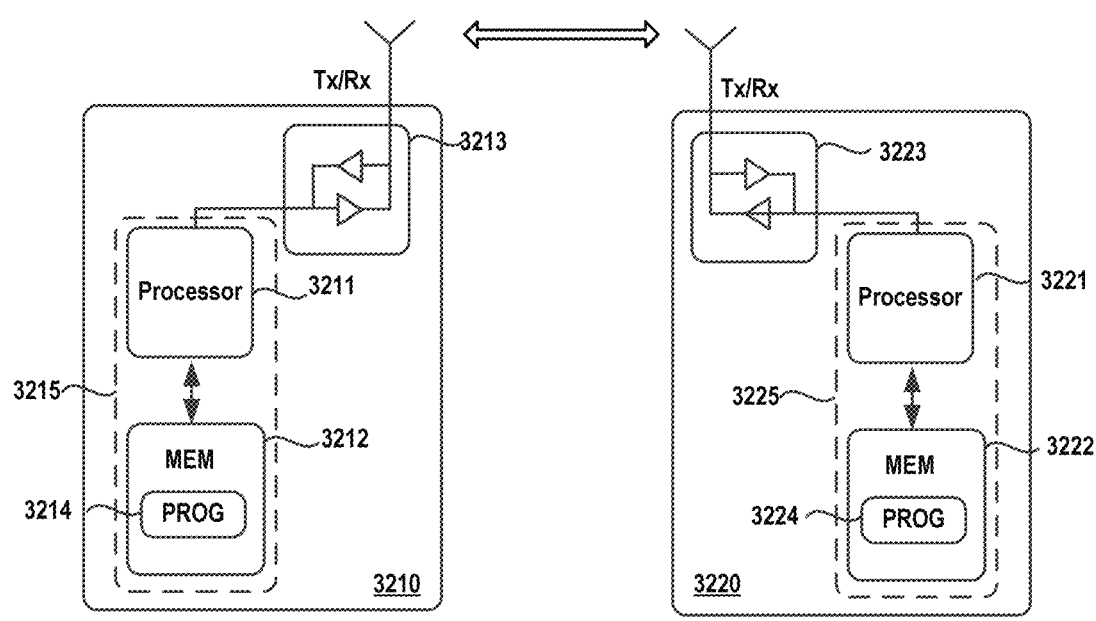
FIG. 32 further illustrates a simplified block diagram of an apparatus 3310 that may be embodied as or comprised in UE and an apparatus 3320 that may be embodied as or comprised in a base station in a wireless network as described herein.

FIG. 32 further illustrates a simplified block diagram of an apparatus 3210 that may be embodied as or comprised in a terminal device such as UE for a wireless network in a wireless network and an apparatus 3220 that may be embodied as or comprised in a base station such as NB or eNB as described herein.

The apparatus 3210 comprises at least one processor 3211, such as a data processor (DP) and at least one memory (MEM) 3212 coupled to the processor 3211. The apparatus 3210 may further comprise a transmitter TX and receiver RX 3213 coupled to the processor 3211, which may be operable to communicatively connect to the apparatus 3220. The MEM 3212 stores a program (PROG) 3214. The PROG 3214 may include instructions that, when executed on the associated processor 3211, enable the apparatus 3210 to operate in accordance with the embodiments of the present disclosure, for example to perform the method 800. A combination of the at least one processor 3211 and the at least one MEM 3212 may form processing means 3215 adapted to implement various embodiments of the present disclosure.

The apparatus 3220 comprises at least one processor 3221, such as a DP, and at least one MEM 3222 coupled to the processor 3221. The apparatus 3220 may further comprise a suitable TX/RX 3223 coupled to the processor 3221, which may be operable for wireless communication with the apparatus 3210. The MEM 3222 stores a PROG 3224. The PROG 3224 may include instructions that, when executed on the associated processor 3221, enable the apparatus 3220 to operate in accordance with the embodiments of the present disclosure, for example to perform the method 2900. A combination of the at least one processor 3221 and the at least one MEM 3222 may form processing means 3225 adapted to implement various embodiments of the present disclosure.

Various embodiments of the present disclosure may be implemented by computer program executable by one or more of the processors 3211, 3221, software, firmware, hardware or in a combination thereof.

The MEMs 3212 and 3222 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 3211 and 3321 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of a user equipment (UE), the method comprising:
generating a first sequence by multiplying a second sequence with $e^{j\alpha n}$, $0 \le n \le 11$,
wherein the second sequence is a base sequence R(n),
wherein a value of cyclic shift α is determined based on a value of k, which is a value for determining the value of the cyclic shift α, the value of k corresponding to a value of HARQ (Hybrid Automatic Repeat Request) ACK (acknowledgement) information bit each HARQ-ACK information bit being: 0 representing a negative acknowledgement (NACK); or 1 representing a positive acknowledgement (ACK), and
wherein $\alpha=2\pi k/12$, $0 \le k \le 11$; and
transmitting a PUCCH (Physical Uplink Control Channel) generated based on the first sequence to a base station.

2. The method according to claim 1,
wherein the base sequence is defined by a formula $R(n)=e^{j\varphi(n)\pi/4}$, and
wherein values of φ(n) vary among −1, 1, −3, or 3 depending on value of n.

3. The method according to claim 1,
wherein the first sequence is mapped to resource elements without being multiplied with symbols modulated from the HARQ-ACK information bit.

4. The method according to claim 1,
wherein the PUCCH is transmitted without frequency-domain multiplexing with a DMRS (Demodulation Reference Signal).

5. The method according to claim 4,
wherein the PUCCH is transmitted without time-domain multiplexing with the DMRS.

6. The method according to claim 1, further comprising:
receiving information indicating a number of symbols to be used for transmission of the PUCCH.

7. The method according to claim 1,
wherein transmission of the PUCCH is 1 symbol or 2 symbols in duration.

8. A user equipment (UE) comprising:
a controller configured to generate a first sequence by multiplying a second sequence with $e^{j\alpha n}$, $0 \le n \le 11$,
wherein the second sequence is a base sequence R(n),
wherein a value of cyclic shift α is determined based on a value of k, which is a value for determining the value of the cyclic shift α, the value of k corresponding to a value of a HARQ (Hybrid Automatic Repeat Request) ACK (acknowledgement) information bit, each HARQ-ACK information bit being: 0 representing a negative acknowledgement (NACK); or 1 representing a positive acknowledgement (ACK), and
wherein $\alpha=2\pi k/12$, $0 \le k \le 11$; and
a transceiver configured to transmit a PUCCH (Physical Uplink Control Channel) generated based on the first sequence to a base station.

9. The UE according to claim 8,
wherein the base sequence is defined by a formula $R(n)=e^{j\varphi(n)\pi/4}$, and
wherein values of φ(n) vary among −1, 1, −3, or 3 depending on value of n.

10. The UE according to claim 8,
wherein the first sequence is mapped to resource elements without being multiplied with symbols modulated from the HARQ-ACK information bit.

11. The UE according to claim 8,
wherein the PUCCH is transmitted without frequency-domain multiplexing with a DMRS (Demodulation Reference Signal).

12. The UE according to claim 8,
wherein the PUCCH is transmitted without time-domain multiplexing with the DMRS.

13. The UE according to claim 8, wherein the transceiver is further configured to:
receive information indicating a number of symbols to be used for transmission of the PUCCH.

14. The UE according to claim 8,
wherein transmission of the PUCCH is 1 symbol or 2 symbols in duration.

15. A method of a user equipment (UE), the method comprising:
generating a first sequence by multiplying a second sequence with $e^{j\alpha n}$,
wherein the second sequence is a base sequence R(n),
wherein a value of cyclic shift α is determined based on a value of k, which is a value for determining the value of the cyclic shift α, the value of k corresponding to a two bit-pair of values of HARQ (Hybrid Automatic Repeat Request)-ACK (acknowledgement) information bits, each bit of the HARQ-ACK information bits being: 0 representing a negative acknowledgement (NACK); or 1 representing a positive acknowledgement (ACK), and
wherein α=2πk/12, 0≤k≤11; and
transmitting a PUCCH (Physical Uplink Control Channel) generated based on the first sequence to a base station.

16. The method according to claim 15, wherein the base sequence is defined by a formula R(n)=$e^{j\varphi(n)\pi/4}$, and wherein values of φ(n) vary among −1, 1, −3, or 3 depending on a value of n.

17. The method according to claim 15, wherein the first sequence is mapped to resource elements without being multiplied with symbols modulated from the HARQ-ACK information bits.

18. The method according to claim 15, wherein the PUCCH is transmitted without frequency-domain multiplexing with a DMRS (Demodulation Reference Signal).

19. The method according to claim 15, wherein the PUCCH is transmitted without time-domain multiplexing with the DMRS.

20. The method according to claim 15, wherein the value of k corresponds to the two bit-pair of the values of HARQ-ACK information bits within a same symbol in time domain.

21. The method according to claim 15, wherein:
a first two bit-pair of values of HARQ-ACK information bits to which one of values of k among {0, 1, 2} corresponds,
a second two bit-pair of values of HARQ-ACK information bits to which one of values of k among {3, 4, 5} corresponds,
a third two bit-pair of values of HARQ-ACK information bits to which one of values of k among {6, 7, 8} corresponds, and
a fourth two bit-pair of values of HARQ-ACK information bits to which one of values of k among {9, 10, 11} corresponds,
are different from each other within a same symbol in time domain.

22. The method according to claim 15, wherein, a difference between:
a first value of k corresponding to a first two bit-pair of values of HARQ-ACK information bits indicated by 00; and
a second value of k corresponding to a second two bit-pair of values of HARQ-ACK information bits different from 00,
is a multiple of 3.

23. The method according to claim 15, wherein, each value of k corresponding to a single two bit-pair of values of HARQ-ACK information bits is UE specific within a same symbol in time domain.

24. The method according to claim 15, further comprising:
receiving information indicating a number of symbols to be used for transmission of the PUCCH.

25. The method according to claim 15, wherein transmission of the PUCCH is 1 symbol or 2 symbols in duration.

26. A user equipment (UE) comprising:
a controller configured to generate a first sequence by multiplying a second sequence with $e^{j\alpha n}$, 0≤n≤11,
wherein the second sequence is a base sequence R(n),
wherein a value of cyclic shift α is determined based on a value of k, which is a value for determining the value of the cyclic shift α, the value of k corresponding to a two bit-pair of values of HARQ (Hybrid Automatic Repeat Request)-ACK (acknowledgement) information bits, each bit of the HARQ-ACK information bits being: 0 representing a negative acknowledgement (NACK); or 1 representing a positive acknowledgement (ACK), and
wherein α=2πk/12, 0≤k≤11; and
a transceiver configured to transmit a PUCCH (Physical Uplink Control Channel) generated based on the first sequence to a base station.

27. The UE according to claim 26, wherein the base sequence is defined by a formula R(n)=$e^{j\varphi(n)\pi/4}$, and
wherein values of φ(n) vary among −1, 1, −3, or 3 depending on value of n.

28. The UE according to claim 26, wherein the first sequence is mapped to resource elements without being multiplied with symbols modulated from the HARQ-ACK information bits.

29. The UE according to claim 26, wherein the PUCCH is transmitted without frequency-domain multiplexing with a DMRS (Demodulation Reference Signal).

30. The UE according to claim 29, wherein the PUCCH is transmitted without time-domain multiplexing with the DMRS.

31. The UE according to claim 26, wherein the value of k corresponds to the two bit-pair of the values of HARQ-ACK information bits within a same symbol in time domain.

32. The UE according to claim 26, wherein:
a first two bit-pair of values of HARQ-ACK information bits to which one of values of k among {0, 1, 2} corresponds,
a second two bit-pair of values of HARQ-ACK information bits to which one of values of k among {3, 4, 5} corresponds,
a third two-bit pair of values HARQ-ACK information bits to which one of values of k among {6, 7, 8} corresponds, and
a fourth two bit-pair of values of HARQ-ACK information bits to which one of values of k among {9, 10, 11} corresponds,
are different from each other within a same symbol in time domain.

33. The UE according to claim 26, wherein, a difference between:
a first value of k corresponding to a first two bit-pair of values of HARQ-ACK information bits indicated by 00; and
a second value of k corresponding to a second two bit-pair of values of HARQ-ACK information bits different from 00, is a multiple of 3.

34. The UE according to claim 26, wherein, each value of k corresponding to a single two bit-pair of values of HARQ-ACK information bits is UE specific within a same symbol in time domain.

35. The UE according to claim 26, wherein the transceiver is further configured to:
  receive information indicating a number of symbols to be used for transmission of the PUCCH.

36. The UE according to claim 26, wherein transmission of the PUCCH is 1 symbol or 2 symbols in duration.

* * * * *

UNITED STATES PATENT AND TRADEMARK OFFICE
CERTIFICATE OF CORRECTION

PATENT NO. : 10,601,622 B2
APPLICATION NO. : 16/234027
DATED : March 24, 2020
INVENTOR(S) : Yukai Gao et al.

Page 1 of 1

It is certified that error appears in the above-identified patent and that said Letters Patent is hereby corrected as shown below:

In the Claims

Column 19, Line 11: In Claim 15, after "$e^{j\alpha n}$," please insert -- $0 \leqq n \leqq 11$, --

Signed and Sealed this
Twenty-sixth Day of May, 2020

Andrei Iancu
*Director of the United States Patent and Trademark Office*